(12) United States Patent
Teng et al.

(10) Patent No.: US 11,865,933 B2
(45) Date of Patent: Jan. 9, 2024

(54) VEHICLE AND ENERGY CONVERSION DEVICE AND POWER SYSTEM THEREOF

(71) Applicant: BYD COMPANY LIMITED, Guangdong (CN)

(72) Inventors: Jingcui Teng, Shenzhen (CN); Yu Liu, Shenzhen (CN); Shulin Liang, Shenzhen (CN); Chao Wang, Shenzhen (CN); Hongbin Luo, Shenzhen (CN)

(73) Assignee: BYD COMPANY LIMITED, Guangdong (CN)

( * ) Notice: Subject to any disclaimer, the term of this patent is extended or adjusted under 35 U.S.C. 154(b) by 65 days.

(21) Appl. No.: 17/624,076

(22) PCT Filed: Jun. 18, 2020

(86) PCT No.: PCT/CN2020/096853
§ 371 (c)(1),
(2) Date: Dec. 30, 2021

(87) PCT Pub. No.: WO2021/000742
PCT Pub. Date: Jan. 7, 2021

(65) Prior Publication Data
US 2022/0355686 A1  Nov. 10, 2022

(30) Foreign Application Priority Data
Jun. 30, 2019 (CN) .......................... 201910582154.9

(51) Int. Cl.
*B60L 53/22* (2019.01)
*H02J 7/02* (2016.01)
*H02P 27/06* (2006.01)
*H02M 3/335* (2006.01)

(52) U.S. Cl.
CPC ................ *B60L 53/22* (2019.02); *H02J 7/02* (2013.01); *H02P 27/06* (2013.01);
(Continued)

(58) Field of Classification Search
CPC .. B60L 53/22; B60L 2210/10; B60L 2210/30; H02J 7/02; H02J 2207/20; H02P 27/06; H02M 3/33584
See application file for complete search history.

(56) References Cited

U.S. PATENT DOCUMENTS

| 2014/0097782 A1 | 4/2014 | Vollmer |
| 2014/0097792 A1 | 4/2014 | Su |

(Continued)

FOREIGN PATENT DOCUMENTS

| CN | 102201693 A | 9/2011 |
| CN | 103684202 A | 3/2014 |

(Continued)

OTHER PUBLICATIONS

International Search Report and Written Opinion for Application No. PCT/CN2020/096853, dated Sep. 22, 2020, 10 pages.

*Primary Examiner* — Jared Fureman
*Assistant Examiner* — Duc M Pham

(57) ABSTRACT

An energy conversion device is provided, including a motor coil (11), a bridge arm converter (12), and a bidirectional bridge arm (13). The bridge arm converter (12) is connected to the motor coil (11) and the bidirectional bridge arm (13). The motor coil (11), the bridge arm converter (12), and the bidirectional bridge arm (13) are all connected to an external charging port (10). Both the bridge arm converter (12) and the bidirectional bridge arm (13) are connected to an external battery 200. The motor coil (11), the bridge arm converter (12), and the external charging port (10) form a DC charging circuit for charging the external battery 200. The motor coil (11), the bridge arm converter (12), the bidirectional bridge arm (13), and the external charging port (10) form an AC charging circuit for charging the external battery (Continued)

(200). The motor coil (11), the bridge arm converter (12), and the external battery (200) form a motor drive circuit.

20 Claims, 10 Drawing Sheets

(52) U.S. Cl.
CPC ....... *B60L 2210/10* (2013.01); *B60L 2210/30* (2013.01); *H02J 2207/20* (2020.01); *H02M 3/33584* (2013.01)

(56) References Cited

U.S. PATENT DOCUMENTS

| | | | |
|---|---|---|---|
| 2018/0134163 A1* | 5/2018 | Kuribara | B60L 53/14 |
| 2018/0178775 A1 | 6/2018 | Ono | |
| 2018/0264958 A1* | 9/2018 | Okada | B60L 53/14 |
| 2019/0168628 A1 | 6/2019 | Pfeilschifter et al. | |

FOREIGN PATENT DOCUMENTS

| | | | | |
|---|---|---|---|---|
| CN | 206742923 U | 12/2017 | | |
| CN | 108173430 A | 6/2018 | | |
| CN | 108258906 A | * 7/2018 | | H02J 3/381 |
| CN | 108258906 A | 7/2018 | | |
| CN | 109361255 A | 2/2019 | | |
| CN | 109742834 A | 5/2019 | | |
| JP | 2010051144 A | 3/2010 | | |
| JP | 2010098851 A | 4/2010 | | |
| JP | 2014517664 A | 7/2014 | | |
| JP | 2014161142 A | 9/2014 | | |
| JP | 2015233355 A | 12/2015 | | |

* cited by examiner

VEHICLE AND ENERGY CONVERSION DEVICE AND POWER SYSTEM THEREOF

CROSS-REFERENCE TO RELATED APPLICATIONS

This application is a National Phase Application of International Patent Application No. PCT/CN2020/096853, filed on Jun. 18, 2020, which is based on and claims priority to and benefit of Chinese Patent Application 201910582154.9, filed on Jun. 30, 2019, and entitled "VEHICLE AND ENERGY CONVERSION DEVICE AND POWER SYSTEM THEREOF." The entire content of all of the above identified applications is incorporated herein by reference.

FIELD

This application relates to the field of electronic technologies, and in particular, to a vehicle and an energy conversion device and a power system thereof.

BACKGROUND

With the development and rapid popularization of electric vehicles, motor control and battery charging of electric vehicles become increasingly important. Currently, motor driving and battery charging of an electric vehicle are independent from each other. That is, a motor drive circuit and a battery charging circuit are two independent and unrelated circuits. The motor drive circuit is only used for motor driving but cannot be used for battery charging. Similarly, the external battery charging circuit can only be used for battery charging but cannot be used for motor driving.

However, although the above method can effectively ensure normal motor driving and battery charging of a vehicle, because the motor drive circuit and the external battery charging circuit in the above method are independent from each other and are unrelated, the above method has a complex circuit structure, a low level of integration, a large volume, and a high cost.

In summary, there are problems that a motor drive system and a charging system have a complex overall circuit structure, a low level of integration, a large volume, and high costs in the prior art.

SUMMARY

This application is intended to resolve the technical problems in the related art at least to some extent.

An objective of this application is to provide a vehicle and an energy conversion device and a power system thereof, to resolve problems that a motor drive system and a charging system have a complex overall structure, a low level of integration, a large volume, and a high cost in the prior art.

This application is implemented as follows. An energy conversion device is provided, which includes a motor coil, a bridge arm converter, and a bidirectional bridge arm, where the bridge arm converter is connected to the motor coil and the bidirectional bridge arm;

the motor coil, the bridge arm converter, and the bidirectional bridge arm are all connected to an external charging port, and the bridge arm converter and the bidirectional bridge arm are connected to an external battery;

the motor coil, the bridge arm converter, and the external charging port form a direct current (DC) charging circuit for charging the external battery;

the motor coil, the bridge arm converter, the bidirectional bridge arm, and the external charging port form an alternating current (AC) charging circuit for charging the external battery; and the motor coil, the bridge arm converter, and the external battery form a motor drive circuit.

Another objective of this application is to provide a power system, which includes the energy conversion device and a control module, where the energy conversion device includes:

a motor, including a motor coil;

a motor control module, including a bridge arm converter, where the bridge arm converter is connected to a first end of the motor coil, and a second end of the motor coil is connected to an external charging port; and an in-vehicle charging module, including a bidirectional bridge arm, where the bidirectional bridge arm is connected to the bridge arm converter in parallel, to form a first common end and a second common end, the first common end is connected to a first end of an external battery, the second common end is connected to a second other end of the external battery, and the external charging port is connected to the second common end and the bidirectional bridge arm; and the control module is configured to: control a DC charging circuit formed by the external charging port, the motor coil, and the bridge arm converter for the external battery, control an AC charging circuit formed by the external charging port, the motor coil, the bridge arm converter, and the bidirectional bridge arm for the external battery, and control a motor drive circuit formed by the motor coil, the bridge arm converter, and the external battery; and the DC charging circuit, the AC charging circuit, and the motor drive circuit share the motor coil and the bridge arm converter.

Another objective of this application is to provide a vehicle, which includes the foregoing power system.

In this application, by using the energy conversion device including a motor coil, a bridge arm converter, and a bidirectional bridge arm, and integrating a driving function and a charging function, the energy conversion device can work in a driving mode, a DC charging mode, and an AC charging mode. Motor driving and battery charging of a vehicle are implemented by using the same system, especially, DC charging and AC charging are implemented by using the same circuit topology, so that a degree of reuse of components is high, a system integration level is high, and a structure is simple, thereby reducing system costs, reducing a system volume, and resolving problems that an existing motor driving system and an existing charging system have a complex overall structure, a low level of integration, a large volume, and high costs.

Additional aspects and advantages of this application will be given in the following description, some of which will become apparent from the following description or may be learned from practices of this application.

DETAILED DESCRIPTION

Figure 1:
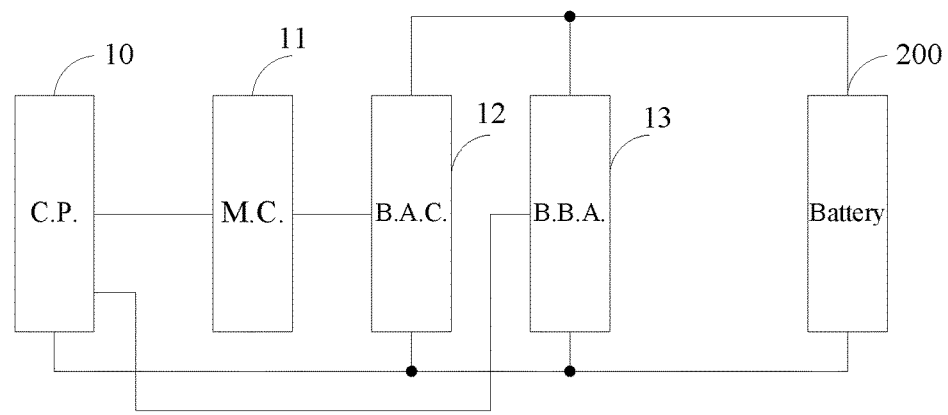
FIG. 1 is a schematic diagram of a module structure of an energy conversion device according to a first embodiment of this application.

Embodiments of this application are described in detail below, and examples of the embodiments are shown in accompanying drawings, where the same or similar elements or the elements having same or similar functions are denoted by the same or similar reference numerals throughout the description. The embodiments described below with reference to the accompanying drawings are exemplary, and are intended to explain this application and cannot be construed as a limitation to this application.

The following describes implementations of this application in detail with reference to specific accompanying drawings.

FIG. 1 shows a module structure of an energy conversion device according to a first embodiment of this application. For ease of description, only a part that is related to this embodiment is shown, and detailed description is as follows.

As shown in FIG. 1, the energy conversion device provided in this embodiment of this application includes a motor coil 11, a bridge arm converter 12, and a bidirectional bridge arm 13.

The bridge arm converter 12 is respectively connected to the motor coil 11 and the bidirectional bridge arm 13. The motor coil 11, the bridge arm converter 12, and the bidirectional bridge arm 13 are all connected to an external charging port 10. Both the bridge arm converter 12 and the bidirectional bridge arm 13 are connected to an external battery 200.

Specifically, the motor coil 11, the bridge arm converter 12, and the external charging port 10 form a DC charging circuit for charging the external battery 200.

The motor coil 11, the bridge arm converter 12, the bidirectional bridge arm 13, and the external charging port 10 form an AC charging circuit for charging the external battery 200.

The motor coil 11, the bridge arm converter 12, and the external battery 200 form a motor drive circuit.

During specific implementation, when the energy conversion device is configured for DC charging or AC charging, the energy conversion device may be connected to an external DC power supply or an external AC power supply by the external charging port 10. The DC power supply may be DC power obtained after the external AC power supply passes through the external charging port and is then rectified, or may be DC power inputted by the external DC power supply through the external charging port. The AC power supply may be AC power obtained after the external DC power supply passes through the external charging port and is then inverted, or may be AC power inputted by the external AC power supply through the external charging port. No specific limitation is imposed herein.

In addition, it should be noted that, during specific work, the energy conversion device may work in the driving mode, the DC charging mode, and the AC charging mode and also work in a DC discharging mode, an AC discharging mode, a driving discharging mode, an emergency mode, or the like. Various working modes of the energy conversion device are described in detail subsequently, and details are not described herein again.

In addition, in this application, "the external battery" and "the external charging port" described in this embodiment are "outside" relative to the energy conversion device, but not "outside" a vehicle in which the energy conversion device is located.

In this embodiment, by using the energy conversion device including the motor coil, the bridge arm converter, and the bidirectional bridge arm, and integrating a driving function and a charging function, the energy conversion device can work in the driving mode, the DC charging mode, and the AC charging mode, and motor driving and battery charging of a vehicle are implemented by using the same system. That is, the motor coil and the bridge arm converter are configured for DC charging, the motor coil, the bridge arm converter, and the bidirectional bridge arm are configured for AC charging, and the motor coil and the bridge arm converter are configured for motor driving, so that the degree of reuse of components is high, the system integration level is high, and the structure is simple, thereby reducing the system costs, reducing the system volume, and resolving the problems that an existing motor driving system and an existing charging system have a complex overall structure, a low level of integration, a large volume, and high costs.

In addition, there is a relatively large difference between charging powers of an existing AC charging system and an existing DC charging system. Consequently, circuit topologies of the two charging systems are relatively different, and the two systems are generally disposed independently with a relatively low degree of reuse. However, the energy conversion device shown in this application has a strong universality, and the energy conversion device can be charged at both a DC charging station or an AC charging station, thereby reducing the system costs, reducing the system volume, and resolving the problems that the existing alternating-current charging system and direct-current charging system have a complex overall structure and a low degree of reuse.

In another embodiment of this application, the bridge arm converter 12 may implement bidirectional conversion. When the energy conversion device works in the driving mode, the bridge arm converter 12 performs the function of three-phase inversion to implement the effect of a motor controller. When the energy conversion device works in the AC charging mode, the bridge arm converter 12 performs the functions of rectification and power correction. When the energy conversion device works in the DC charging mode, the bridge arm converter 12 performs the function of DC boosting.

In the related art, AC charging needs to be implemented by using an AC charging module, DC charging needs to be implemented by using a DC charging module, and motor driving needs to be implemented by using an inversion module. There is no related art that integrates the three functions into one module, resulting in a complex circuit structure, a low level of integration, a large volume, and high costs. In this application, the three function are creatively integrated into the same circuit, to implement reuse of functions of a plurality of components.

In another embodiment of this application, the motor coil 11, the bridge arm converter 12, and the bidirectional bridge arm 13 implement reuse of functions. In the motor drive circuit, the motor coil 11 is configured to generate an induced electromotive force after being energized, and the bridge arm converter 12 is configured to implement the function of three-phase inversion. In the AC charging circuit, the motor coil 11 is configured to serve as an inductor in a PFC circuit, the bridge arm converter 12 is configured to serve as a group of bridge arms in the PFC circuit, and the bidirectional bridge arm 13 serves as another group of bridge arms in the PFC circuit. In the DC charging circuit, the motor coil 11 is configured to serve as a boost inductor in DC boosting and reduce a ripple in the circuit, and the bridge arm converter 12 is configured to serve as a bridge arm in DC boosting.

In addition, in the prior art, the AC charging system and the DC charging system are disposed independently with a low degree of reuse, resulting in relatively large volumes of the two systems and high costs. In this application, the energy conversion device can implement both an AC charging function and a DC charging function, to implement reuse of functions, that is, both the motor coil and the bridge arm converter in this application participate in AC charging and DC charging, to implement reuse of components, so that the problems of a complex structure, a low degree of reuse, high costs, and a large volume in the prior art are resolved through reuse of functions and reuse of components.

In another embodiment of this application, a household power strip is generally used during AC charging, and a power of a common AC power supply is generally 7 kW. A dedicated charging pile is generally used during DC charging, a power is generally 60 kW to 150 kW, and a rapid DC charging pile has a power greater than 100 kW. In addition, a power during motor driving is generally about 100 kW. Therefore, it can be learned from the descriptions that power classes of a vehicle in the three cases of motor driving, DC charging, and AC charging are very different, and the power difference is very important for the selection of a switch tube.

For switch tubes, a high-power switch tube is more expensive than a low-power switch tube. Therefore, in consideration of different powers required when the energy conversion device works in the motor driving mode, the DC charging mode, and the AC charging mode, a type of a switch tube in the bridge arm converter 12 is different from a type of a switch tube in the bidirectional bridge arm 13, that is, the bidirectional bridge arm 13 and the bridge arm converter 12 adopt the switch tubes with different power classes. In an embodiment, a power class of a switch tube used by the bridge arm converter 12 is greater than a power class of a switch tube used by the bidirectional bridge arm 13. For example, in switch tubes of the same type, the bridge arm converter 12 adopts a metal-oxide-semiconductor field-effect transistor (MOSFET) switch tube with a high current level, and the bidirectional bridge arm 13 adopts a MOSFET switch tube with a low current level. For example, in switch tubes of different types, the bridge arm converter 12 adopts a high-power insulated gate bipolar transistor (IGBT) switch tube, and the bidirectional bridge arm 13 adopts a low-power MOSFET switch tube. Specifically, in this embodiment, because the bridge arm converter 12 is used for both high-power modes such as DC charging and motor driving, in this embodiment, the bridge arm converter 12 is implemented by using the high-power IGBT switch tube or the MOSFET switch tube with the high current level. Because the bidirectional bridge arm 13 mainly works for AC charging, the bidirectional bridge arm 13 may be implemented by using the low-power MOSFET switch tube. Therefore, the circuit costs can be reduced while the effective work of the energy conversion device is ensured.

On the other hand, because during AC charging, the bidirectional bridge arm 13 requires a relatively high switching frequency (for example, 60 kHz), a MOSFET switch tube or a silicon carbide MOSFET switch tube that can achieve relatively high efficiency during high frequency work may be adopted. Because the bridge arm converter 12 has three-phase bridge arms, and it operates using a three-phase interleaved control, a frequency required by the switch tube of the bridge arm converter 12 is relatively low. Therefore, the type of the switch tube of the bridge arm converter 12 is different from the type of the switch tube of the bidirectional bridge arm 13. For example, the type of the switch tube of the bridge arm converter 12 is an IGBT switch tube with relatively high efficiency during low frequency work.

In addition, when the energy conversion device works in the AC charging mode or in the DC charging mode, the bridge arm converter 12 can reduce a DC side ripple and increase charging efficiency in the working manner of three-phase interleaved control when the energy conversion device is charged.

When the energy conversion device in this application is configured for an AC/DC charging performance test, a design concept of increasing overall inductance of the energy conversion device is provided to improve the charging efficiency, and is found to be one of the feasible manners to improve inductance of the motor coil based on a structure of a motor.

Figure 2:
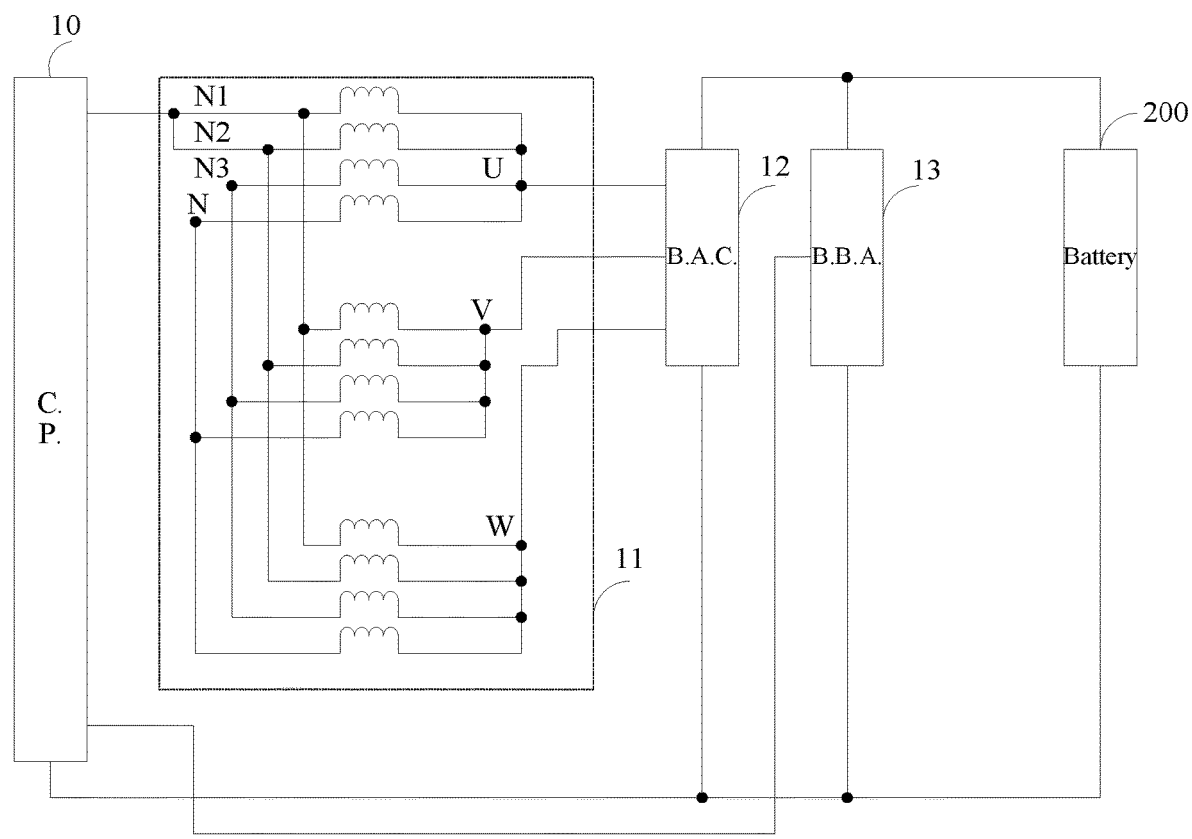
FIG. 2 is a schematic diagram of a circuit structure of the energy conversion device according to the first embodiment of this application.

In an embodiment of this application, as shown in FIG. 2, each of three-phase windings of the motor coil 11 includes N coil branches. First ends of N coil branches in each phase winding are connected together and then connected to the bridge arm converter 12. Second ends of the N coil branches in each phase winding are connected to second ends of N coil branches in the two other phase windings in a one-to-one correspondence, to form N neutral points. The external charging port 10 is connected to M neutral points of the N neutral points. N is an integer greater than 1 and is 4, and M is a positive integer less than N.

Specifically, in FIG. 2, a specific structure of the motor coil 11 in this application is described by using an example in which a value of M is 2 and a value of N is 4. That is, two neutral points in four neutral points are connected to the external charging port 10. It should be noted that, in this embodiment, for example, each phase winding of the motor coil 11 includes four coil branches. A specific quantity of coil branches is not limited.

The following describes the three-phase windings of the motor coil 11 in detail by using an example, and a detailed description is as follows.

As shown in FIG. 2, the motor coil 11 includes a U-phase winding, a V-phase winding, and a W-phase winding, and each of the U-phase winding, the V-phase winding, and the W-phase winding includes N coil branches.

As shown in FIG. 2, first ends of the N coil branches in the U-phase winding are connected together and then connected to a first-phase bridge arm of the bridge arm converter 12. First ends of the N coil branches in the V-phase winding are connected together and then connected to a second-phase bridge arm of the bridge arm converter 12. First ends of the N coil branches in the W-phase windings are connected together and then connected to a third-phase bridge arm of the bridge arm converter 12. Second ends of the N coil branches in each phase winding of the U-phase winding, the V-phase winding, and the W-phase winding are connected to second ends of the N coil branches in the two other phase windings in a one-to-one correspondence, to form N neutral points N1, N2, N3, . . . , and N. The N neutral points may be directly connected to the external charging port 10 or may be connected to the external charging port 10 by another connection circuit. In this embodiment, using an example in which M neutral points in the N neutral points are directly connected to the external charging port 10, the connection circuit is described in detail subsequently. Details are not described herein again.

In this embodiment, compared with that all the neutral points of the motor coil are connected to the external charging port, some neutral points are connected to the external charging port, so that the motor coils connected in parallel are reduced, equivalent inductance of the motor coil is increased, and the overall inductance of the energy conversion device is increased, thereby improving the charging efficiency.

In another embodiment, when taking a charging power and charging efficiency into consideration, the charging power is positively correlated with an overcurrent capability of the motor coil, and more motor coils connected in parallel indicates a stronger overcurrent capability. The charging efficiency is negatively correlated with the inductance of the motor coil, and fewer motor coils connected in parallel indicates a greater inductance of the motor coil. In this embodiment, using the motor coil 11 having N coil branches in each phase winding, the energy conversion device can implement DC charging or AC charging with different powers by changing the inductance value of the motor coil 11, to implement the adjustment of a charging power of the energy conversion device using the inductance value.

Figure 3:
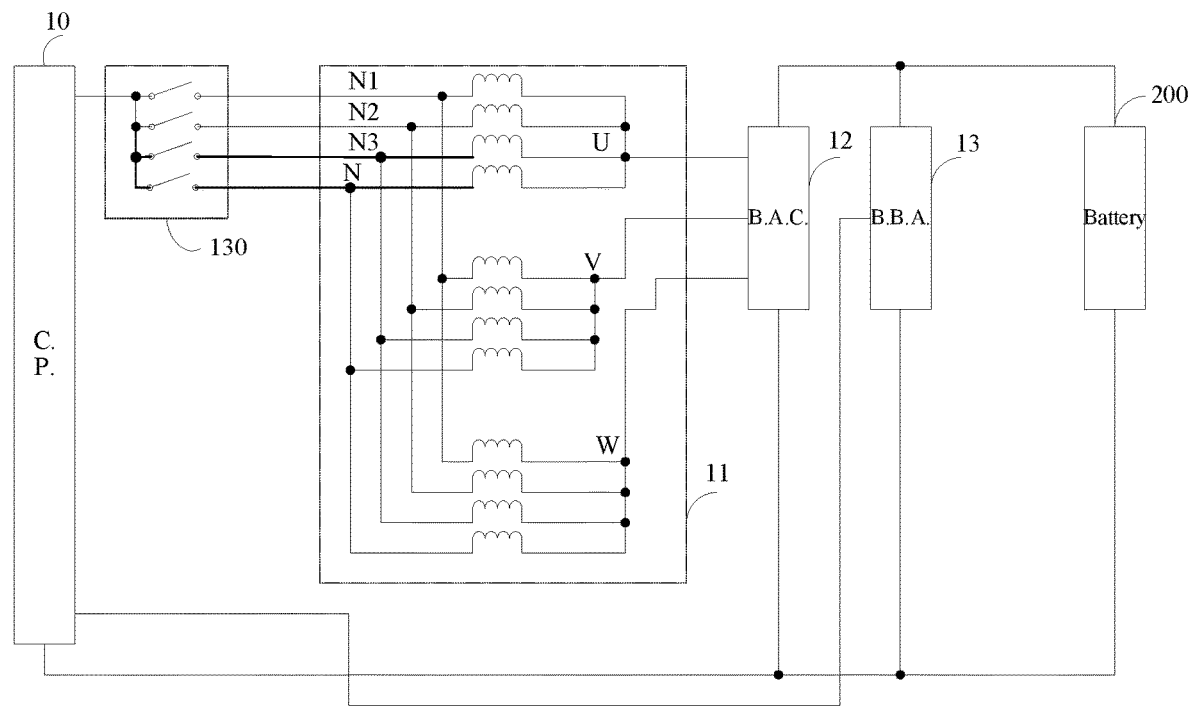
FIG. 3 is a schematic diagram of a circuit structure of an energy conversion device according to a second embodiment of this application.

In an embodiment of this application, as shown in FIG. 3, the energy conversion device further includes a neutral point switch 130. The neutral point switch 130 is configured to control the M neutral points in the N neutral points of the motor coil 11 to be connected to the external charging port 10.

In an embodiment, the neutral point switch 130 may be implemented by using N single-pole single-throw switches or may be implemented by using a plurality of single-pole double-throw switches. When the neutral point switch 130 is implemented by using the N single-pole single-throw switches, first ends of the N single-pole single-throw switches are connected to the N neutral points of the motor coil 11 in a one-to-one correspondence, and second ends of the N single-pole single-throw switches are all connected to the external charging port 10. When the neutral point switch 130 is implemented by using the plurality of single-pole double-throw switches, moving ends of the plurality of single-pole double-throw switches are all connected to the external charging port 10, and two fixed ends of each single-pole double-throw switch is connected to two neutral points of the motor coil 11 in a one-to-one correspondence according to a requirement. In addition, the neutral point switch 130 may be implemented by using a single-pole multi-throw switch. A moving end of the single-pole multi-throw switch is connected to the external charging port 10. Fixed ends of the single-pole multi-throw switch are respectively connected to the neutral points of the motor coil 11 in a one-to-one correspondence according to a requirement.

In this embodiment, the energy conversion device comprises a neutral point switch 130, and the neutral point switch is selectively turned on or turned off, so that the neutral point switch 130 connects the external charging port 10 to the M neutral points in the N neutral points of the motor coil 11. The energy conversion device turns on or turns off switches in the neutral point switch 130 according to a requirement, to select different quantities of coil branches from the three-phase windings of the motor coil 11, thereby implementing adjustment of the charging power.

Figure 4:
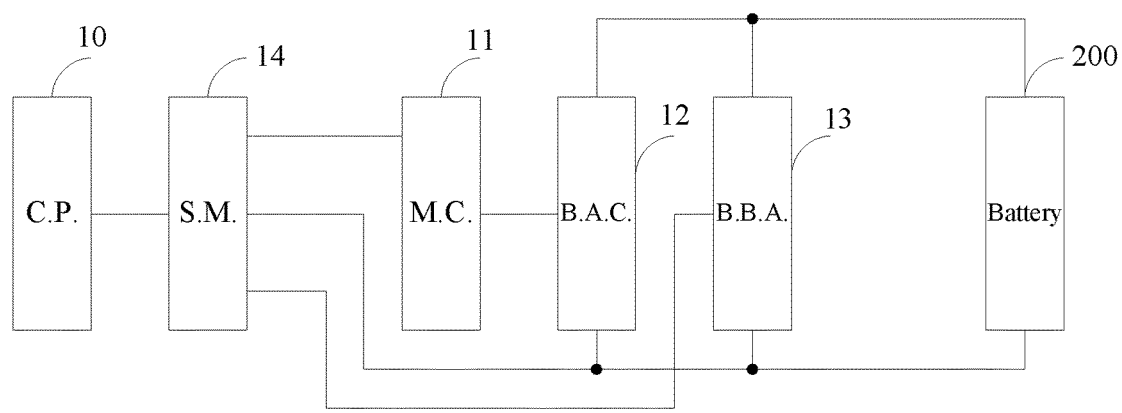
FIG. 4 is a schematic diagram of a module structure of the energy conversion device according to the second embodiment of this application.

In an embodiment of this application, as shown in FIG. 4, the energy conversion device further includes a switch module 14.

One end of the switch module 14 is connected to the external charging port 10, and the other end is respectively connected to the motor coil 11, the bridge arm converter 12, and the bidirectional bridge arm 13. The switch module 14 is configured to switch between the driving mode, the DC charging mode, and the AC charging mode.

In this embodiment, the energy conversion device includes the switch module 14, so that the switch module 14 can facilitate the switching of the energy conversion device between the driving mode, the DC charging mode, and the AC charging mode, to effectively prevent the energy conversion device from failing when mode switching cannot be performed accurately, thereby improving the reliability of the energy conversion device.

Figure 5:
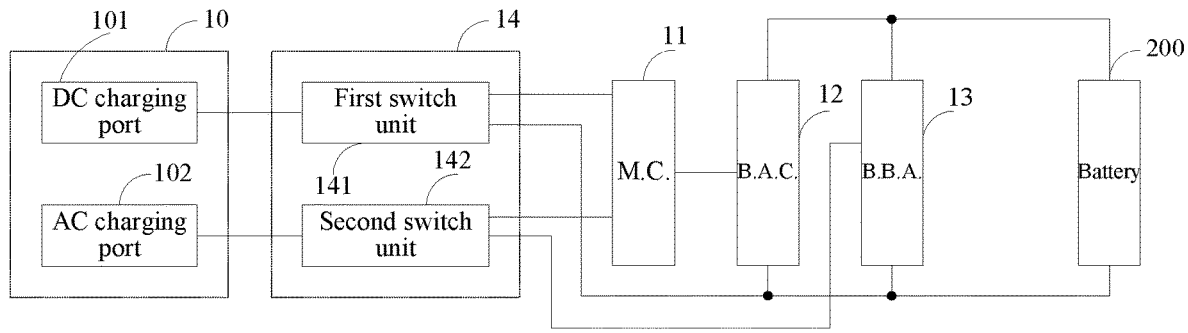
FIG. 5 is a schematic diagram of a module structure of an energy conversion device according to a third embodiment of this application.

In an embodiment of this application, as shown in FIG. 5, the external charging port 10 includes a DC charging port 101 and an AC charging port 102. The switch module 14 includes a first switch unit 141 and a second switch unit 142.

The DC charging port 101, the first switch unit 141, the motor coil 11, and the bridge arm converter 12 form a DC charging circuit for the external battery 200. The AC charging port 102, the second switch unit 142, the motor coil 11, the bridge arm converter 12, and the bidirectional bridge arm 13 form an AC charging circuit for the external battery 200. In a discharging mode, the DC charging port 101, the first switch unit 141, the motor coil 11, the bridge arm converter 12, and the external battery 200 form a DC discharging circuit. The AC charging port 102, the second switch unit 142, the motor coil 11, the bridge arm converter 12, and the bidirectional bridge arm 13 form an AC discharging circuit for the external battery 200.

In this embodiment, the external charging port 10 that is formed by the DC charging port 101 and the AC charging port 102, and the switch module 14 that is formed by the first switch unit 141 and the second switch unit 142 are used, so that when working in the DC charging mode or the AC charging mode, the energy conversion device has charging circuits corresponding to different modes, and the DC charging circuit and the AC charging circuit do not interfere with each other, resulting in high circuit reliability and the stability.

Figure 6:
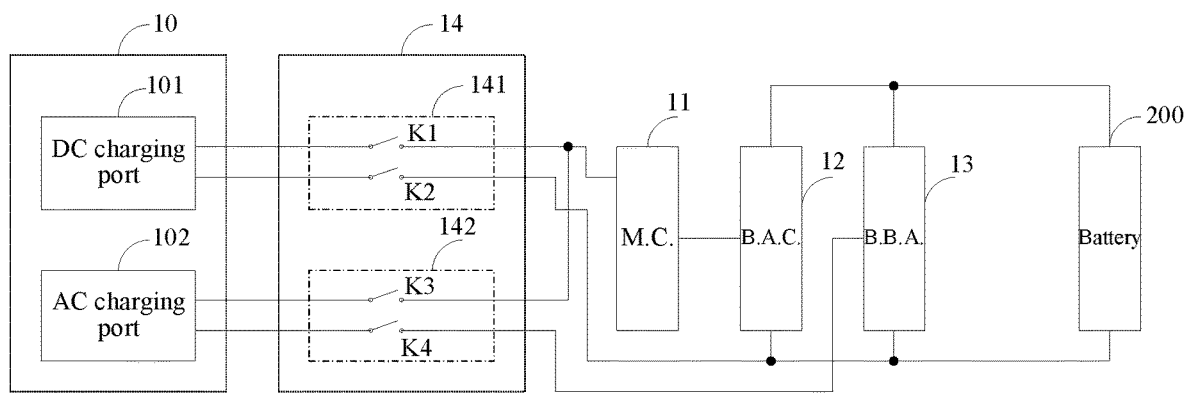
FIG. 6 is a schematic diagram of a circuit structure of the energy conversion device according to the third embodiment of this application.

In an embodiment of this application, as shown in FIG. 6, the first switch unit 141 includes a first switch K1 and a second switch K2. One end of the first switch K1 is connected to the DC charging port 101, and the other end is connected to the motor coil 11. One end of the second switch K2 is connected to the DC charging port 101, and the other end is connected to the bridge arm converter 12. The second switch unit 142 includes a third switch K3 and a fourth switch K4. One end of the third switch K3 is connected to the AC charging port 102, and the other end is connected to the motor coil 11. One end of the fourth switch K4 is connected to the AC charging port 102, and the other end is connected to the bidirectional bridge arm 13 and is specifically connected to a midpoint of the bidirectional bridge arm 13.

Specifically, still referring to FIG. 6, in this embodiment, during specific implementation, the first switch K1, the second switch K2, the third switch K3, and the fourth switch K4 are all implemented by using single-pole single-throw switches. Both a first end of the first switch K1 and a first end of the second switch K2 are connected to the DC charging port 101, a second end of the first switch K1 is connected to a neutral point of the motor coil 11, and a second end of the second switch K2 is connected to a negative end of the bridge arm converter 12. Similarly, both a first end of the third switch K3 and a first end of the fourth switch K4 are connected to the AC charging port 102, a second end of the third switch K3 is connected to the neutral point of the motor coil 11, and a second end of the fourth switch K4 is connected to the midpoint of the bidirectional bridge arm 13.

During specific implementation, when the energy conversion device works in the driving mode, the first switch K1, the second switch K2, the third switch K3, and the fourth switch K4 are all open. In this case, the external battery 200, the bridge arm converter 12, and the motor coil 11 form a motor drive loop. When the energy conversion device works in the DC charging mode, the first switch K1 and the second switch K2 are closed, and the third switch K3 and the fourth switch K4 are open. In this case, the DC charging port 101, the first switch K1, the second switch K2, the motor coil 11, the bridge arm converter 12, and the external battery 200 form a DC charging loop. When the energy conversion device works in the AC charging mode, the third switch K3 and the fourth switch K4 are closed, and the first switch K1 and the second switch K2 are open. In this case, the AC charging port 102, the third switch K3, the fourth switch K4, the motor coil 11, the bridge arm converter 12, the bidirectional bridge arm 13, and the external battery 200 form an AC charging loop. In the discharging mode, the DC charging port 101, the first switch K1, the second switch K2, the motor coil 11, and the bridge arm converter 12 form the DC discharging loop for the external battery 200, and the AC charging port 102, the third switch K3, the fourth switch K4, the motor coil 11, the bridge arm converter 12, and the bidirectional bridge arm 13 form the AC discharging loop for the external battery 200.

Figure 7:
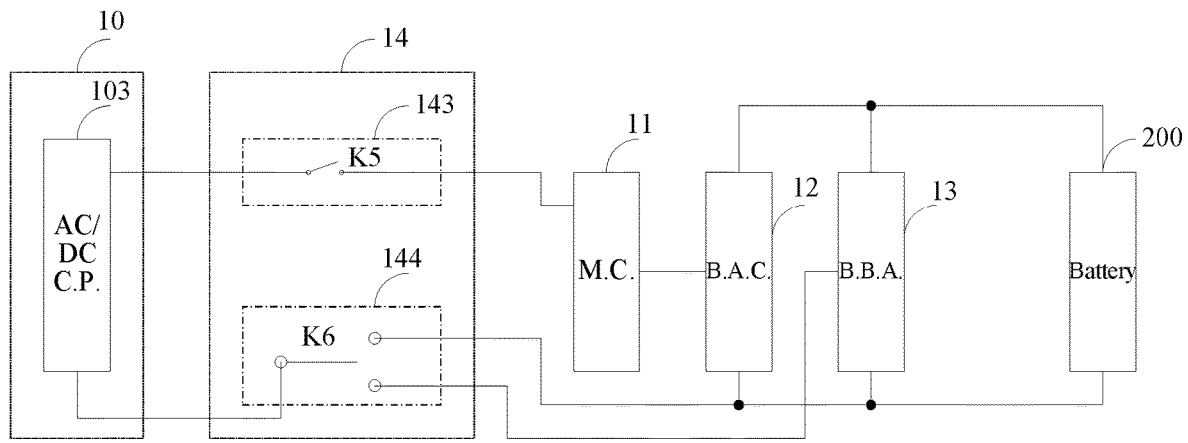
FIG. 7 is a schematic diagram of another circuit structure of the energy conversion device according to the third embodiment of this application.

In an embodiment of this application, as shown in FIG. 7, the external charging port 10 includes an AC/DC charging port 103, and the switch module 14 includes a third switch unit 143 and a fourth switch unit 144. One end of the third switch unit 143 is connected to the AC/DC charging port 103, and the other end is connected to the motor coil 11. One end of the fourth switch unit 144 is connected to the AC/DC charging port 103, and the other end of the fourth switch unit 144 is connected to the bridge arm converter 12 or the bidirectional bridge arm 13.

During specific implementation, a first end of the third switch unit 143 is connected to the AC/DC charging port 103, and a second end of the third switch unit 143 is connected to the neutral point of the motor coil 11. One end of the fourth switch unit 144 is connected to the AC/DC charging port 103, and the other end of the fourth switch unit is selectively connected to the negative end of the bridge arm converter 12 or the midpoint of the bidirectional bridge arm 13.

When the fourth switch unit 144 is connected to the bridge arm converter 12, the AC/DC charging port 103, the third switch unit 143, the fourth switch unit 144, the motor coil 11, the bridge arm converter 12, and the external battery 200 form a DC charging circuit or a DC discharging circuit. When the fourth switch unit 144 is connected to the bidirectional bridge arm 13, the AC/DC charging port 103, the third switch unit 143, the fourth switch unit 144, the motor coil 11, the bridge arm converter 12, and the bidirectional bridge arm 13 form an AC charging circuit or an AC discharging circuit for the external battery.

In this embodiment, the external charging port 10 that is formed by the AC/DC charging port 103, and the switch module 14 that is formed by the third switch unit 143 and the fourth switch unit 144 are used, so that when the energy conversion device works in the DC charging mode or the AC charging mode, an external AC power supply or an external DC power supply can provide charging energy to the energy conversion device by using the AC/DC charging port 103. The fourth switch unit 144 causes the energy conversion device to have a DC charging circuit or an AC charging circuit corresponding to different modes, so that the DC charging circuit and the AC charging circuit do not interfere with each other, resulting in that the circuit reliability is high, the stability is high, and the circuit level of integration is high.

In an embodiment of this application, as shown in FIG. 7, the third switch unit 143 includes a fifth switch K5. One end of the fifth switch K5 is connected to the AC/DC charging port 103, and the other end is connected to the neutral point of the motor coil 11. The fourth switch unit 144 includes a single-pole double-throw switch K6. The single-pole double-throw switch K6 includes one moving end and two fixed ends. The moving end is connected to the AC/DC charging port 103. One fixed end is connected to the bridge arm converter 12, and the other fixed end is connected to the midpoint of the bidirectional bridge arm 13. In an embodiment, the fourth switch unit 144 includes two switches. One end of one switch is connected to the AC/DC charging port 103, and the other end is connected to the bridge arm converter 12. One end of the other switch is connected to the AC/DC charging port 103, and the other end is connected to the bidirectional bridge arm 13.

It should be noted that, a description is made by using an example in which the fourth switch unit 144 is implemented by using the single-pole double-throw switch K6 in FIG. 7. When the fourth switch unit 144 is implemented by using two single-pole single-throw switches, both first ends of the two single-pole single-throw switches are connected to the AC/DC charging port, a second end of the first single-pole single-throw switch is connected to the negative end of the bridge arm converter 12, and a second end of the second single-pole single-throw switch is connected to the midpoint of the bidirectional bridge arm 13.

In addition, in one embodiment, when the energy conversion device works in the driving mode, both the fifth switch K5 and the single-pole double-throw switch are open. In this case, the external battery 200, the bridge arm converter 12, and the motor coil 11 form a motor drive loop. When the energy conversion device works in the DC charging mode, the fifth switch K5 is closed, and the first fixed end of the single-pole double-throw switch K6 is closed. In this case, the AC/DC charging port 103, the fifth switch K5, the single-pole double-throw switch K6, the motor coil 11, the bridge arm converter 12, and the external battery 200 form a DC charging loop. When the energy conversion device works in the AC charging mode, the fifth switch K5 is closed, and the second fixed end of the single-pole double-throw switch is closed. In this case, the AC/DC charging port 103, the fifth switch K5, the single-pole double-throw switch K6, the motor coil 11, the bridge arm converter 12, the bidirectional bridge arm 13, and the external battery 200 form an AC charging loop.

In this embodiment, the switch K5 and the single-pole double-throw switch K6 are used, so that the switch K5 and the single-pole double-throw switch K6 can replace the first switch K1 to the fourth switch K4 in another embodiment, and electronic elements used by the switch module 14 are reduced during switching among the driving mode, the DC charging mode, and the AC charging mode, to reduce a quantity of electronic elements of the energy conversion device, thereby reducing costs of the energy conversion device while a simpler circuit structure is implemented.

Figure 8:
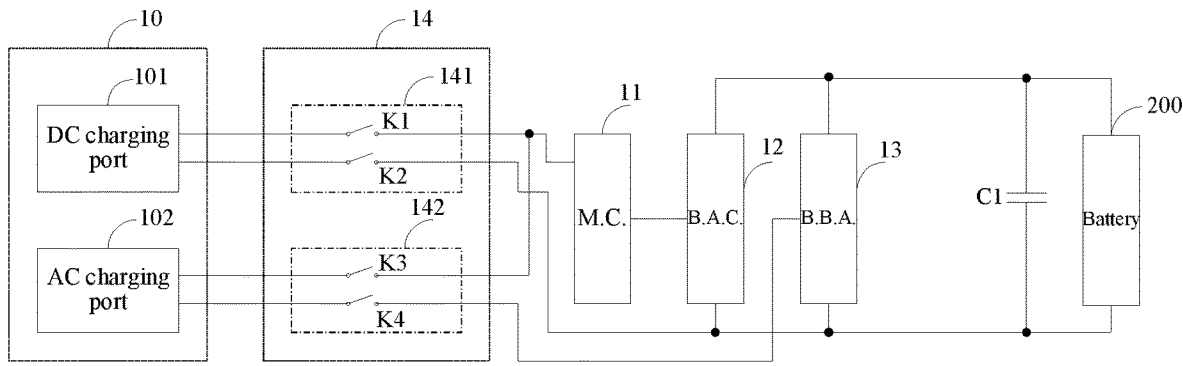
FIG. 8 is a schematic diagram of a circuit structure of an energy conversion device according to a fourth embodiment of this application.

In an embodiment of this application, as shown in FIG. 8, the energy conversion device further includes a first capacitor C1. The first capacitor C1 is connected to the bidirectional bridge arm 13 in parallel. The first capacitor C1 also implements reuse of functions. The AC charging circuit, the DC charging circuit, and the motor drive circuit of the energy conversion device all share the first capacitor C1. Specifically, the motor coil 11, the bridge arm converter 12, the first capacitor C1, and the external charging port form a DC charging circuit for charging the external battery. The motor coil 11, the bridge arm converter 12, the bidirectional bridge arm 13, the first capacitor C1, and the external charging port form an AC charging circuit for charging the external battery. The motor coil 11, the bridge arm converter 12, the first capacitor C1, and the external battery form the motor drive circuit. The reuse of the first capacitor can improve the electric energy conversion efficiency and the energy utilization during DC charging, and can also reduce noise generated by a harmonic current on a power grid side and pollution to the power grid during AC charging, the quality of power supplied by the power grid is improved, and a high-frequency switching frequency and a high-order harmonic wave generated through inversion during driving are absorbed, to improve energy storage performance after inversion boost and ensure that the bridge arm converter has a stable and pure DC bus voltage. The degree of reuse of components is high, the level of integration of the energy conversion device is high, and the structure is simple, thereby reducing the costs of the energy conversion device and reducing the volume of the energy conversion device.

Specifically, as shown in FIG. 8, the first capacitor C1 is connected to the bridge arm converter 12 and the bidirectional bridge arm 13 in parallel.

When the energy conversion device works in the DC charging mode or the AC charging mode, the first capacitor C1 may filter a voltage outputted by the bridge arm converter 12 or voltages outputted by the bridge arm converter 12 and the bidirectional bridge arm 13, and may further perform energy storage according to the voltage outputted by the bridge arm converter 12 or the voltages outputted by the bridge arm converter 12 and the bidirectional bridge arm 13 during DC charging or AC charging of the external battery 200, to complete DC charging or AC charging of the external battery 200.

In this embodiment, the first capacitor C1 is disposed in the energy conversion device, so that the first capacitor C1 can filter a voltage outputted by the bridge arm converter 12 or voltages outputted by the bridge arm converter 12 and the bidirectional bridge arm 13, and can also perform energy storage according to the voltage outputted by the bridge arm converter 12 or the voltages outputted by the bridge arm converter 12 and the bidirectional bridge arm 13, to complete DC charging or AC charging of the external battery 200. Therefore, a normal charging function of the energy conversion device is ensured, and it can be further ensured that other clutters are prevented from interfering with the charging process. In addition, when the energy conversion device works in the motor driving mode, the first capacitor C1 may serve as a motor controller capacitor, so that the first capacitor C1 may be used as a PFC capacitor or may be reused as the motor controller capacitor, thereby improving the utilization of the electronic elements in the energy conversion device while a structure of the energy conversion device is simplified.

Figure 9:
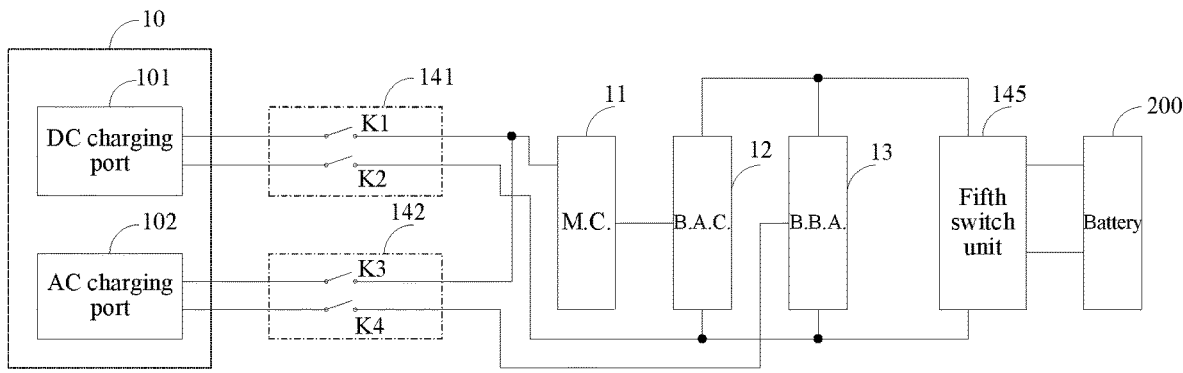
FIG. 9 is a schematic diagram of a module structure of an energy conversion device according to a fifth embodiment of this application.

In an embodiment of this application, as shown in FIG. 9, the switch module further includes a fifth switch unit 145. One end of the fifth switch unit 145 is connected to the external battery 200, and the other end is respectively connected to the bridge arm converter 12 and the bidirectional bridge arm 13.

In this embodiment, the fifth switch unit 145 is added to the switch module, and the external battery 200 is connected to the bridge arm converter 12 and the bidirectional bridge arm 13 by the fifth switch unit 145, so that when a front-end circuit of the energy conversion device fails (for example, any one of the switch module 14, the motor coil 11, the bridge arm converter 12, and the bidirectional bridge arm 13 fails), the fifth switch unit 145 can be controlled to protect the external battery 200 from damage, thereby prolonging the service life of the external battery 200.

Figure 10:
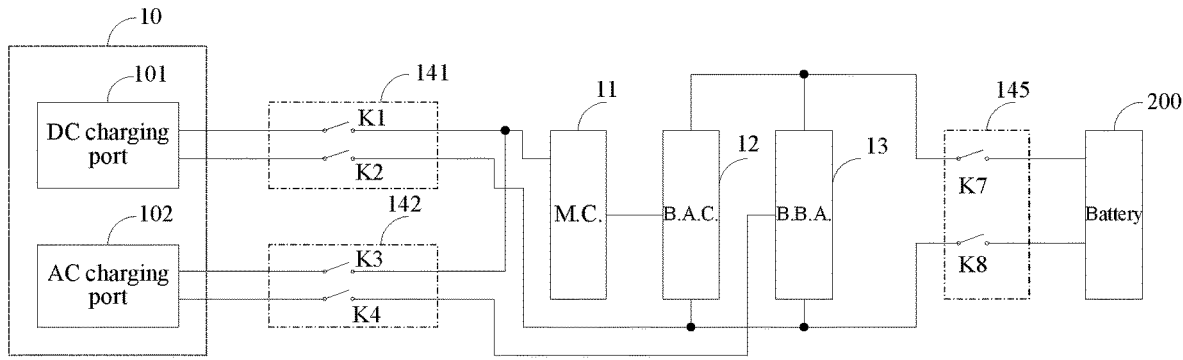
FIG. 10 is a schematic diagram of a circuit structure of the energy conversion device according to the fifth embodiment of this application.
Figure 11:
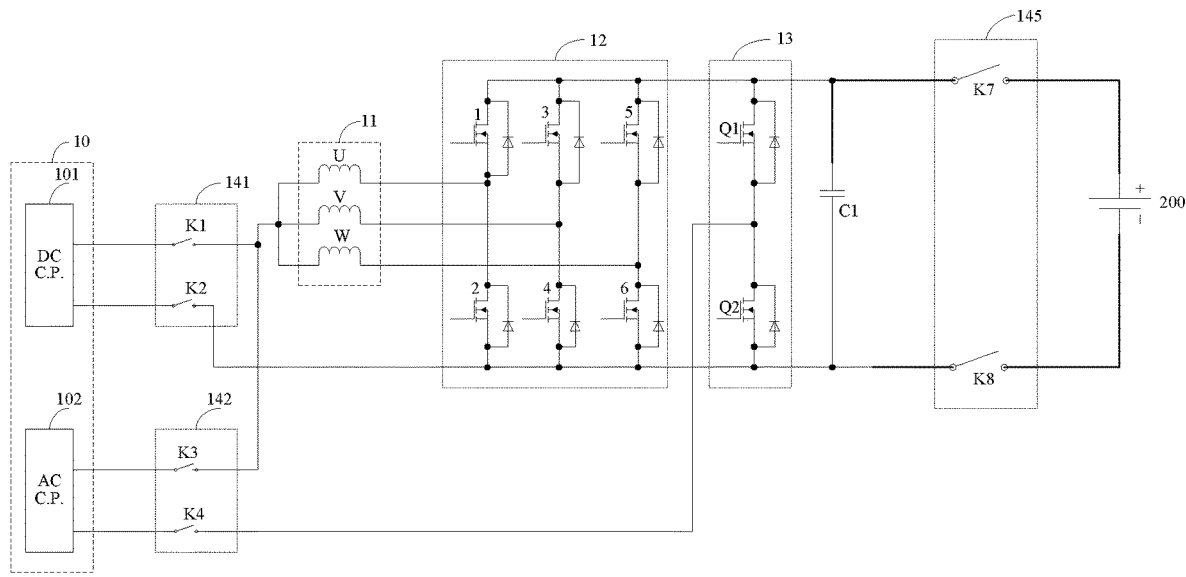
FIG. 11 is a schematic diagram of another circuit structure of the energy conversion device according to the fifth embodiment of this application.

In an embodiment of this application, as shown in FIG. 10, the fifth switch unit 145 includes a switch K7 and a switch K8. A first end of the switch K7 is connected to a positive electrode of the external battery 200, and a first end of the switch K8 is connected to a negative electrode of the external battery 200. A second end of the switch K7 is connected to a positive end of the bridge arm converter 12 and a positive end of the bidirectional bridge arm 13. A second end of the switch K8 is connected to a negative end of the bridge arm converter 12 and a negative end of the bidirectional bridge arm 13.

Figure 12:
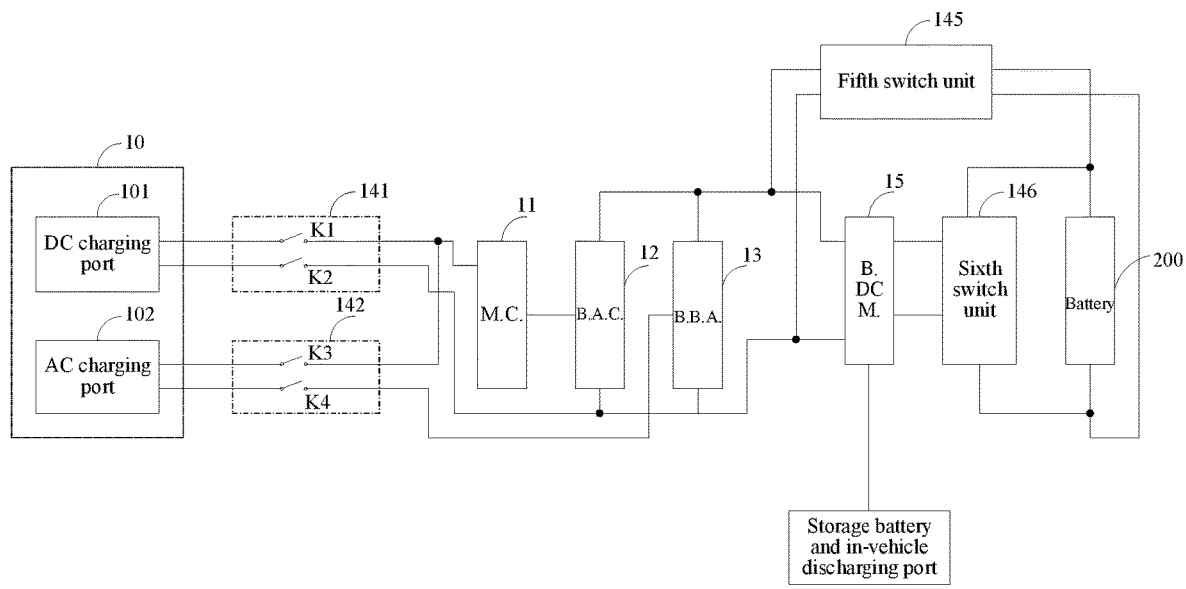
FIG. 12 is a schematic diagram of a module structure of an energy conversion device according to a sixth embodiment of this application.

In an embodiment of this application, as shown in FIG. 12, the energy conversion device further includes a bidirectional DC module 15. The switch module 14 further includes a sixth switch unit 146. The bidirectional DC module 15 includes a first DC end and a second DC end. The first DC end is connected to the bidirectional bridge arm 13, the second DC end is connected to one end of the sixth switch unit 146, and the other end of the sixth switch unit 146 is connected to the external battery 200.

In this embodiment, the sixth switch unit 146 is added to the switch module 14, and the bidirectional DC module 15 is added to the energy conversion device, so that the bidirectional DC module 15 and the sixth switch unit 146 form another AC or DC charging circuit with the external charging port 10, the motor coil 11, the bridge arm converter 12, and the bidirectional bridge arm 13 in the energy conversion device, to enrich the AC or DC charging mode of the energy conversion device, and the energy conversion device can not only perform isolated DC charging but also perform non-isolated DC charging during DC charging, so that the charging process of the energy conversion device can implement redundancy using a plurality of solutions, thereby improving the safety of the energy conversion device in the AC charging process.

Figure 14:
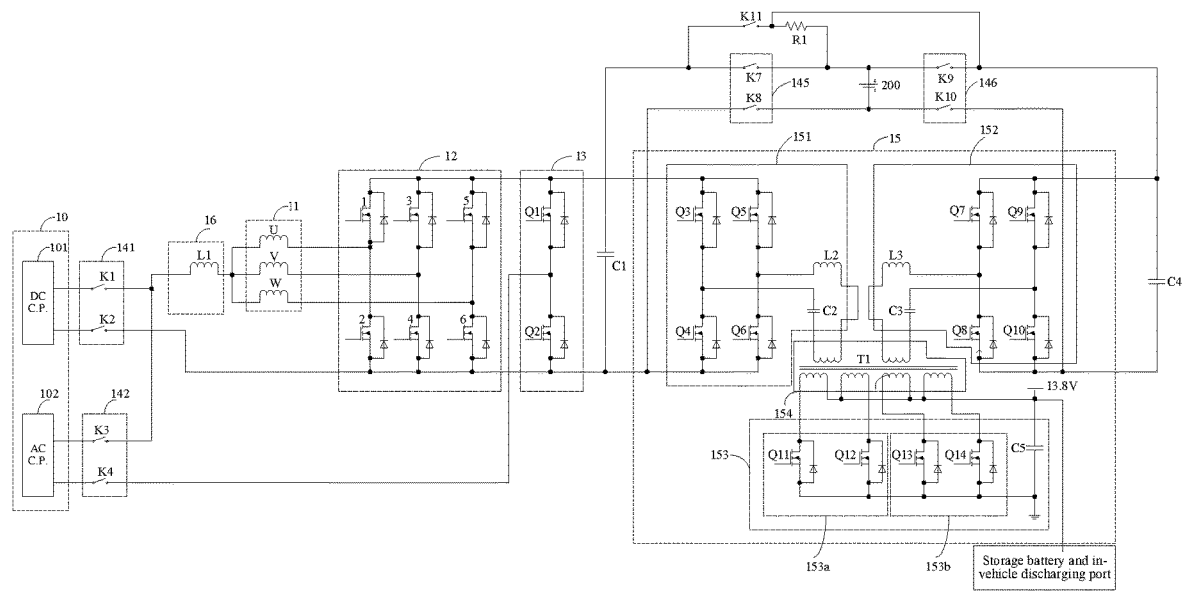
FIG. 14 is a schematic diagram of a circuit structure of the energy conversion device according to the seventh embodiment of this application.

In an embodiment of this application, as shown in FIG. 14, the sixth switch unit 146 includes a switch K9 and a switch K10. A first end of the switch K9 is connected to the positive electrode of the external battery 200, and a first end of the switch K10 is connected to the negative electrode of the external battery 200. A second end of the switch K9 is connected to the second end of the bidirectional DC module 15, and a second end of the switch K10 is connected to the second DC end of the bidirectional DC module 15.

In an embodiment of this application, as shown in FIG. 12, the bidirectional DC module 15 further includes a third DC end, and the third DC end is connected to a storage battery or an in-vehicle discharging port.

In this embodiment, the bidirectional DC module 15 including the third DC end is used, so that the bidirectional DC module 15 can be connected to the storage battery and the in-vehicle discharging port by the third DC end, and the energy conversion device can perform motor driving by using energy provided by the storage battery or can supply power to an external device by using the in-vehicle discharging port, thereby enriching the working modes of the energy conversion device and improving an applicable range of the energy conversion device.

In addition, in this embodiment of this application, both the external battery and the storage battery can be charged, discharging can be performed on a load in a vehicle, emergency drive can be performed, or the like by using the bidirectional DC module 15, that is, the bidirectional DC module 15 is reused in different working modes of the energy conversion device without adding different circuits in the different working modes, thereby reducing complexity and costs of the energy conversion device.

Figure 13:
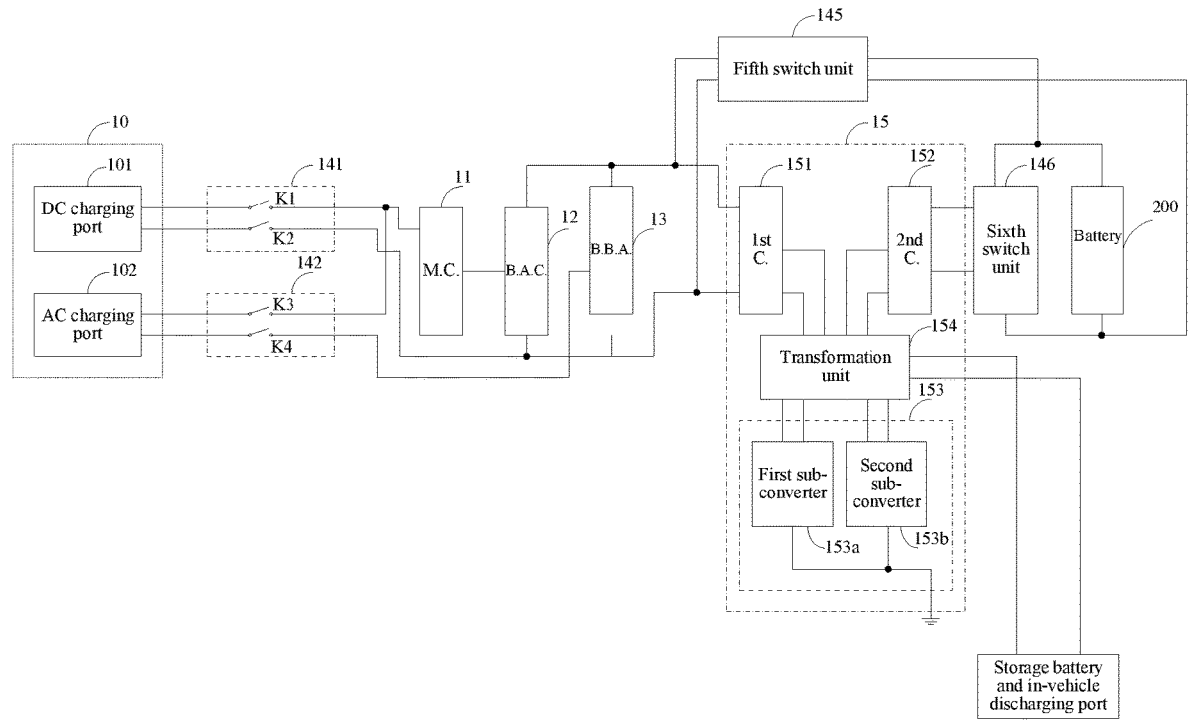
FIG. 13 is a schematic diagram of a module structure of an energy conversion device according to a seventh embodiment of this application.

In an embodiment of this application, as shown in FIG. 13, the bidirectional DC module 15 includes a first converter 151, a second converter 152, a third converter 153, and a transformation unit 154. A primary side, a first secondary side, and a second secondary side of the transformation unit 154 are respectively connected to the first converter 151, the second converter 152, and the third converter 153, that is, the primary side of the transformation unit 154 is connected to the first converter 151, the first secondary side of the transformation unit 154 is connected to the second converter 152, and the second secondary side of the transformation unit 154 is connected to the third converter 153. The first converter 151 is connected to the bidirectional bridge arm 13 in parallel, the second converter 152 is connected to the external battery 200 in parallel, and the third converter 153 is connected to the storage battery or the in-vehicle discharging port in parallel.

In this embodiment, the bidirectional DC module 15 including the first converter 151, the second converter 152, the third converter 153, and the transformation unit 154 is used, so that when the energy conversion device works, another AC or DC charging circuit may be formed by the external charging port 10, the motor coil 11, the bridge arm converter 12, the bidirectional bridge arm 13, the first converter 151, the transformation unit 154, the second converter 152, the sixth switch unit 146, and the external battery 200, to implement other AC or DC charging. The external charging port 10, the motor coil 11, the bridge arm converter 12, the bidirectional bridge arm 13, the first converter 151, the transformation unit 154, the third converter 153, and the storage battery or the in-vehicle discharging port form a storage battery charging circuit or an in-vehicle discharging port circuit, so that when working, the another AC charging circuit and the storage battery charging circuit or the in-vehicle discharging port circuit do not interfere with each other, to improve the circuit reliability.

In an embodiment of this application, as shown in FIG. 13, the third converter 153 includes a first sub-converter 153a and a second sub-converter 153b. Both the first sub-converter 153a and the second sub-converter 153b are connected to the second secondary side of the transformation unit 154.

Specifically, a working mode of the third converter 153 includes a first state in which the first sub-converter 153a and the second sub-converter 153b work simultaneously and a second state in which the first sub-converter 153a and the second sub-converter 153b are switched to work. That is, when the third converter 153 works, the first sub-converter 153a inside the third converter may serve as a converter alone, or the second sub-converter 153b serves as a converter alone, or the first sub-converter 153a and the second sub-converter 153b work simultaneously, to implement a converter function of the third converter 153.

In this embodiment, the third converter 153 is implemented by using the first sub-converter 153a and the second sub-converter 153b, so that when the energy conversion device works, either of the first sub-converter 153a and the second sub-converter 153b can implement the function of the third converter 153. When either of the first sub-converter 153a and the second sub-converter 153b fails, the energy conversion device is not affected. In addition, when the first sub-converter 153a and the second sub-converter 153*b* implement the function of the third converter 153 simultaneously, a rectification capability of the third converter 153 can be improved.

In an embodiment of this application, as shown in FIG. 14, the first converter 151 includes switch units Q3, Q4, Q5, and Q6, an inductor L2, and a capacitor C2. The switch units Q3, Q4, Q5, and Q6 form a full-bridge rectification circuit. An input terminal of the switch unit Q3 and an input terminal of the switch unit Q5 are connected together to form the first DC end of the bidirectional DC module 15. An output terminal of the switch unit Q4 and an output terminal of the switch unit Q6 are connected together to form the first DC end of the bidirectional DC module 15. An output terminal of the switch unit Q3 is connected to an input terminal of the switch unit Q4 and a first end of the capacitor C2. A second end of the capacitor C2 is connected to the primary side of the transformation unit 154. An output terminal of the switch unit Q5 is connected to an input terminal of the switch unit Q6 and a first end of the inductor L2. A second end of the inductor L2 is connected to the primary side of the transformation unit 154.

In an embodiment of this application, as shown in FIG. 14, the second converter 152 includes switch units Q7, Q8, Q9, and Q10, an inductor L3, and a capacitor C3. The switch units Q7, Q8, Q9, and Q10 form a full-bridge rectification circuit, an input terminal of the switch unit Q7 and an input terminal of the switch unit Q9 are connected together to form the second DC end of the bidirectional DC module 15. An output terminal of the switch unit Q8 and an output terminal of the switch unit Q10 are connected together to form the second DC end of the bidirectional DC module 15. An output terminal of the switch unit Q7 is connected to an input terminal of the switch unit Q8 and a first end of the capacitor C3. A second end of the capacitor C3 is connected to the first secondary side of the transformation unit 154. An output terminal of the switch unit Q9 is connected to an input terminal of the switch unit Q10 and a first end of the inductor L3. A second end of the inductor L3 is connected to the first secondary side of the transformation unit 154.

In another embodiment of this application, the energy conversion device further includes a charging end connection group. The charging end connection group includes a first connection end and a second connection end. One end of the first connection end is connected to the DC charging port 101, and the other end is connected to the motor coil 11 and the bridge arm converter 12. One end of the second connection end is connected to the AC charging port 102, and the other end is connected to the motor coil 11 and the bidirectional bridge arm 13.

In another embodiment of this application, the energy conversion device further includes an energy storage end group. The energy storage end group includes a first energy connection end and a second energy connection end. One end of the first energy connection end is connected to the external battery, and the other end is connected to the bridge arm converter 12. One end of the second connection end is connected to the external battery 200, and the other end is connected to the bidirectional DC module 15.

In an embodiment of this application, as shown in FIG. 14, the first sub-converter 153*a* includes switch units Q11 and Q12, and the second sub-converter 153*b* includes switch units Q13 and Q14. Input terminals of the switch units Q11, Q12, Q13, and Q14 are all connected to the second secondary side of the transformation unit 154, and output terminals of the switch units Q11, Q12, Q13, and Q14 are grounded.

It should be noted that, in this embodiment of this application, a plurality of switch units included in the bidirectional DC module 15 may be implemented by using devices that are connected in parallel with diodes and can perform an on/off action. For example, there are switch devices such as a power bipolar junction transistor, a MOSFET, and an IGBT.

In an embodiment of this application, as shown in FIG. 14, the transformation unit 154 includes a transformer T1. A primary side of the transformer T1 is the primary side of the transformation unit 154. A first secondary side of the transformer T1 is the first secondary side of the transformation unit 154. A second secondary side of the transformer T1 is the second secondary side of the transformation unit 154. The second secondary side forms the third DC end of the bidirectional DC module 15.

In an embodiment of this application, as shown in FIG. 14, the energy conversion device further includes a voltage inductor L1. One end of the inductor L1 is connected to the external charging port 10, and the other end is connected to the motor coil 11.

Specifically, in an embodiment of this application, as shown in FIG. 14, a first end of the inductor L1 is connected to the second end of the switch K1 and the second end of the switch K3. A second end of the inductor L1 is connected to a neutral point of the three-phase windings of the motor coil 11.

Specifically, in the DC charging mode, the external charging port 10, the inductor L1, the motor coil 11, and the bridge arm converter 12 form a DC charging circuit for the external battery 200.

In the AC charging mode, the external charging port 10, the inductor L1, the motor coil 11, the bridge arm converter 12, and the bidirectional bridge arm 13 form an AC charging circuit for the external battery 200.

In this embodiment, when the energy conversion device works in the AC charging mode, the inductor L1 cooperates with the bidirectional bridge arm 13, to convert AC power received by the external charging port 10 into a target voltage, and then AC charging is performed on the external battery 200. That is, during charging of the external battery 200, when an ideal voltage needs to be outputted for charging the external battery 200, the outputted voltage in the charging process can be adjusted through a joint action of the inductor L1 and the bidirectional bridge arm 13, to ensure a voltage conversion function of the energy conversion device.

Figure 16:
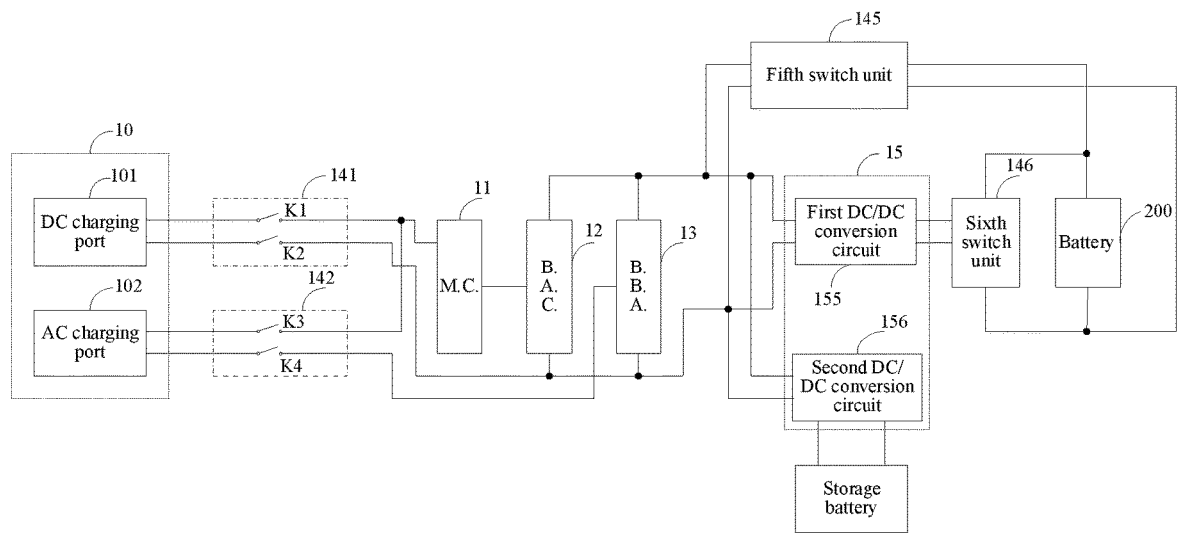
FIG. 16 is a schematic diagram of a module structure of an energy conversion device according to a ninth embodiment of this application.

In an embodiment of this application, as shown in FIG. 16, the bidirectional DC module 15 includes a first DC/DC conversion circuit 155 and a second DC/DC conversion circuit 156.

One end of the first DC/DC conversion circuit 155 is connected to the bidirectional bridge arm 13, and the other end is connected to the sixth switch unit 146.

One end of the second DC/DC conversion circuit 156 is connected to the bidirectional bridge arm 13, and the other end is connected to the storage battery.

In this embodiment, the bidirectional DC module 15 including the first DC/DC conversion circuit 155 and the second DC/DC conversion circuit 156 is used, so that the bidirectional DC module 15 can be connected to the external battery 200 by the first DC/DC conversion circuit 155 and can be connected to the storage battery by the second DC/DC conversion circuit 156, and the energy conversion device can perform motor driving by using energy provided by the storage battery. In addition, the external battery can be charged, thereby enriching the working modes of the energy conversion device, and improving the applicable range of the energy conversion device.

Figure 17:
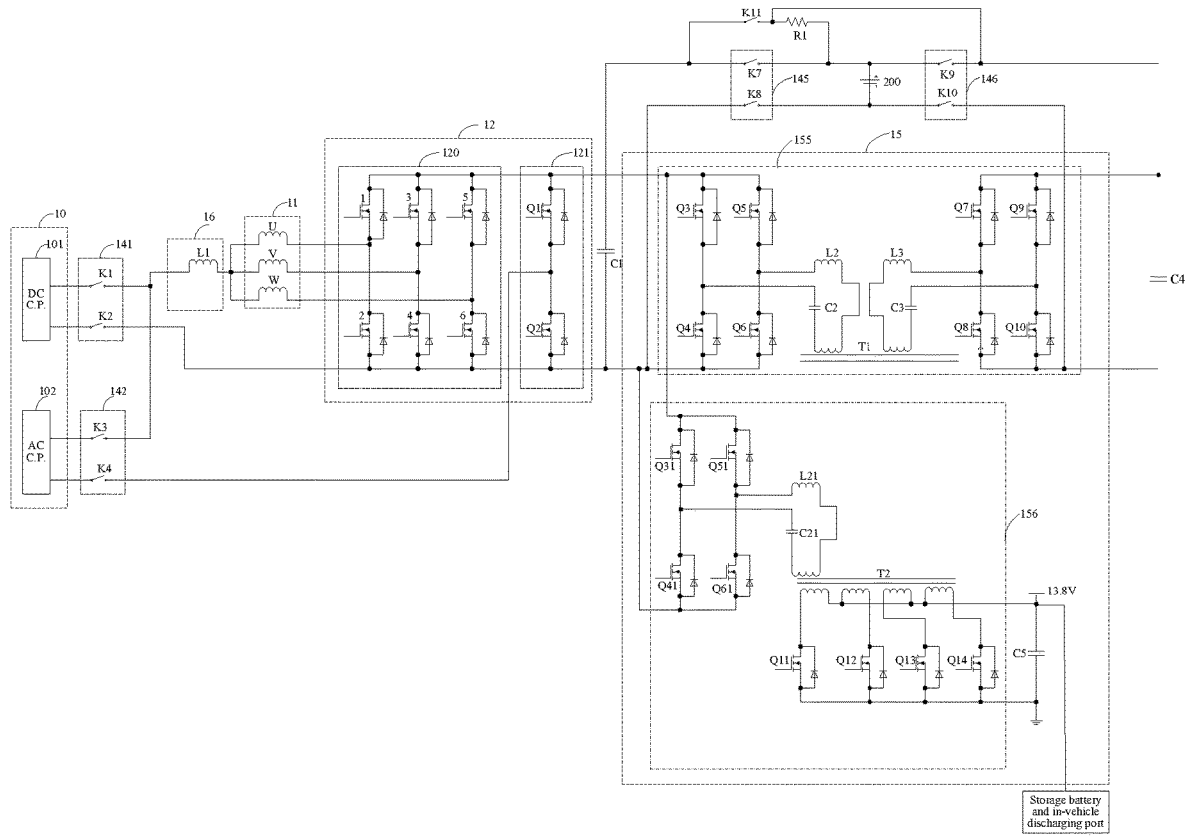
FIG. 17 is a schematic diagram of a circuit structure of the energy conversion device according to the ninth embodiment of this application.

During specific implementation, as shown in FIG. 17, the first DC/DC conversion circuit 155 includes a switch tube Q3 to a switch tube Q10, an inductor L2 and an inductor L3, a capacitor C2 and a capacitor C3, and a transformer T1. A connection relationship among the switch tube Q3 to the switch tube Q10, the inductor L2 and the inductor L3, and the capacitor C2 and the capacitor C3 is the same as a connection relationship between the first converter 151 and the second converter 152 shown in FIG. 14. Therefore, reference can be made to a related description in FIG. 14, and details are not described herein again. In addition, for a connection relationship between the transformer T1 and another component, reference may be made to a specific illustration in FIG. 16, and details are not described herein again similarly.

In addition, the second DC/DC conversion circuit 156 includes a switch tube Q31, a switch tube Q41, a switch tube Q51, a switch tube Q61, a switch tube Q11, a switch tube Q12, a switch tube Q13, a switch tube Q14, an inductor L21, a capacitor C21, and a transformer T2. For a connection relationship among the switch tube Q31, the switch tube Q41, the switch tube Q51, the switch tube Q61, the switch tube Q11, the switch tube Q12, the switch tube Q13, the switch tube Q14, the inductor L21, the capacitor C21, and the transformer T2, reference may be made to a specific illustration in FIG. 14. Details are not described herein again.

Figure 15:
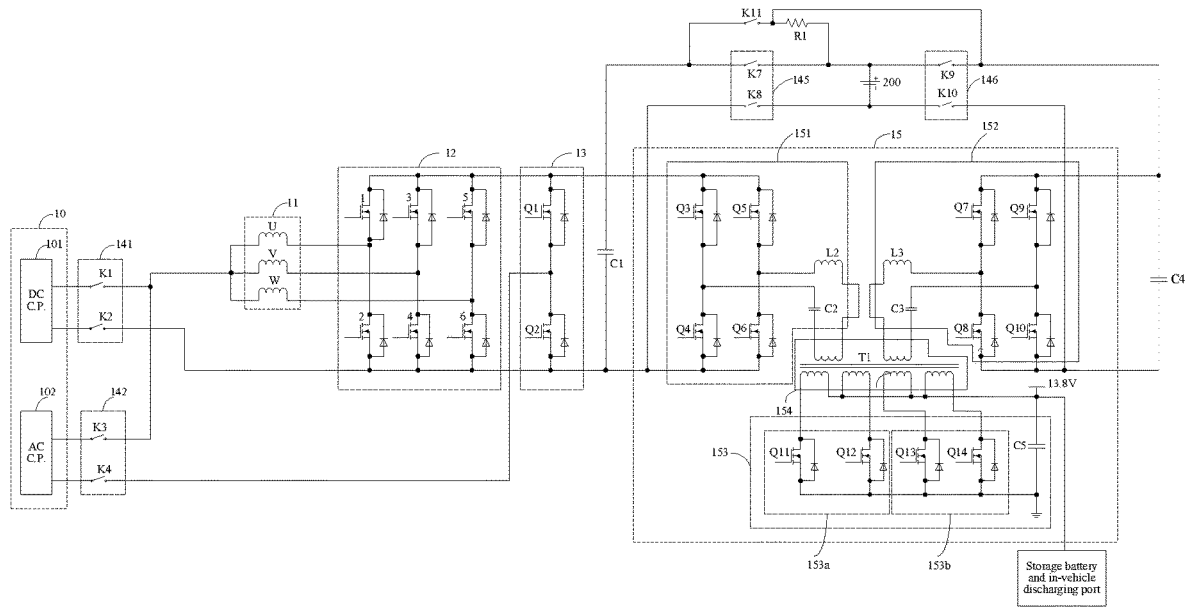
FIG. 15 is a schematic diagram of a module structure of an energy conversion device according to an eighth embodiment of this application.

In this application, by using the bidirectional DC module 15 shown in FIG. 15 or FIG. 17, when the energy conversion device cannot output a current normally because the power battery 200 is fed severely or the power battery 200 fails, the storage battery can supply power to a motor by using the bidirectional DC module 15 and the bridge arm converter 12 in a manner of opening the fifth switch unit 145 and the sixth switch unit 146, to drive the motor, thereby implementing emergency drive.

In an embodiment of this application, as shown in FIG. 15 or FIG. 17, the energy conversion device further includes a switch K11 and a resistor R1. The switch K11 and the resistor R1 form a pre-charging module, to pre-charge the switch K7 and switch K9 during working of the energy conversion device, to prevent the switch K7 and the switch K9 from failure, thereby reducing a failure rate of the energy conversion device.

Specifically, as shown in FIG. 15 or FIG. 17, a first end of the switch K11 is connected to the second end of the switch K7, a second end of the switch K11 is connected to the second end of the switch K9 and a first end of the resistor R1, and a second end of the resistor R1 is connected to the first end of the switch K7, the first end of the switch K9, and the positive electrode of the external battery 200.

In an embodiment of this application, as shown in FIG. 11, FIG. 14, FIG. 15, or FIG. 17, the bridge arm converter 12 in the energy conversion device includes three-phase bridge arms formed by a first power switch unit 1 and a second power switch unit 2 connected in series, a third power switch unit 3 and a fourth power switch unit 4 connected in series, and a fifth power switch unit 5 and a sixth power switch unit 6 connected in series.

Specifically, a first end of the first power switch unit 1, a first end of the third power switch unit 3, and a first end of the fifth power switch unit 5 are connected together to form a positive end of the bridge arm converter 12, and the positive end of the bridge arm converter 12 is connected to a positive end of the bidirectional bridge arm 13.

A second end of the second power switch unit 2, a second end of the fourth power switch unit 4, and a second end of the sixth power switch unit 6 are connected together to form a negative end of the bridge arm converter 12, and the negative end of the bridge arm converter 12 is connected to a negative end of the bidirectional bridge arm 13.

A connection point between a second end of the first power switch unit 1 and a first end of the second power switch unit 2 is connected to a first phase coil of the motor coil 11. A connection point between a second end of the third power switch unit 3 and a first end of the fourth power switch unit 4 is connected to a second phase coil of the motor coil 11. A connection point between a second end of the fifth power switch unit 5 and a first end of the sixth power switch unit 6 is connected to a third phase coil of the motor coil 11.

It should be noted that, in this embodiment of this application, a plurality of power switch units of the bridge arm converter 12 may be implemented by using devices that are connected in parallel with diodes and can perform an on-off action, for example, there are switch devices such as a power bipolar junction transistor, a MOSFET, and an IGBT.

In another embodiment of this application, when the bridge arm converter 12 works, the power switch units in a first-phase bridge arm, the power switch units in a second-phase bridge arm, and the power switch units in a third-phase bridge arm sequentially receive control signals that are different by a preset phase to enter a three-phase interleaved control manner. It should be noted that, in this embodiment, the preset phase is an angle of 120°, and the preferred angle does not constitute a limitation on the preset phase.

Figure 18:
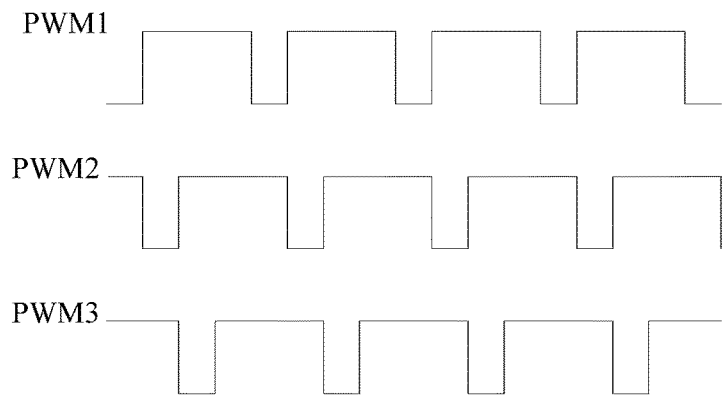
FIG. 18 is a schematic diagram of a working sequence of the energy conversion device according to the ninth embodiment of this application.

Specifically, when the bridge arm converter 12 works, with reference to a working sequence diagram shown in FIG. 18, it can be learned that on or off of the first power switch unit 1 and the second power switch unit 2 in the first-phase bridge arm of the bridge arm converter 12 is controlled by using a control signal PWM1. When the control signal PWM1 is at a high level, the first power switch unit 1 is controlled to be turned on, and the second power switch unit 2 is controlled to be opened. When the control signal PWM1 is at a low level, the second power switch unit 2 is controlled to be turned on, and the first power switch unit 1 is controlled to be opened. After a preset phase difference from the control signal PWM1, on or off of the third power switch unit 3 and the fourth power switch unit 4 in the second-phase bridge arm of the bridge arm converter 12 is controlled by using a control signal PWM2. When the control signal PWM2 is at a high level, the third power switch unit 3 is controlled to be turned on, and the fourth power switch unit 4 is controlled to be opened. When the control signal PWM2 is at a low level, the fourth power switch unit 4 is controlled to be turned on, and the third power switch unit 3 is controlled to be opened. After a preset phase difference from the control signal PWM2, on or off of the fifth power switch unit 5 and the sixth power switch unit 6 in the third-phase bridge arm of the bridge arm converter 12 is controlled by using a control signal PWM3. When the control signal PWM3 is at a high level, the fifth power switch unit 5 is controlled to be turned on, and the sixth power switch unit 6 is controlled to be opened. When the control signal PWM3 is at a low level, the sixth power switch unit 6 is controlled to be turned on, and the fifth power switch unit 5 is controlled to be opened. Therefore, three-phase interleaved control of the bridge arm converter 12 is implemented.

In this embodiment, the three-phase bridge arms of the bridge arm converter 12 are controlled in a three-phase interleaved control working manner, and when the energy conversion device is charged, an equivalent inductance can be improved effectively, so that a charging power is increased, and the inductor L1 is not required to be added to the energy conversion device, thereby reducing a quantity of electronic elements in the energy conversion device and reducing the costs of the energy conversion device.

In an embodiment of this application, as shown in FIG. 11, FIG. 14, FIG. 15, or FIG. 17, the bidirectional bridge arm 13 in the energy conversion device includes a seventh power switch unit Q1 and an eighth power switch unit Q2 connected in series. A first end of the seventh power switch unit Q1 is the positive end of the bidirectional bridge arm 13. A second end of the eighth power switch unit Q2 is the negative end of the bidirectional bridge arm 13. A connection point between a second end of the seventh power switch unit Q1 and a first end of the eighth power switch unit Q2 is the midpoint of the bidirectional bridge arm 13.

A working principle of the energy conversion device provided in this application in different embodiments are described in detail below by using the circuits shown in FIG. 14 and FIG. 15 as an example. A detailed description is as follows.

Specifically, as shown in FIG. 14, when the energy conversion device works in the DC charging mode, and the DC charging mode is non-isolated DC charging, the first switch K1, the second switch K2, the switch K11, the switch K7, and the switch K8 are closed, and other switch elements K3, K4, K9, and K10 are open. In this case, a DC voltage received by the DC charging port 101 is boosted though the inductor L1, the three-phase windings U, V, and W of the motor coil 11, and the bridge arm converter 12, and then is outputted to the external battery 200 through the capacitor C1, to implement DC charging of the external battery 200.

In an embodiment, as shown in FIG. 15, when the energy conversion device works in the DC charging mode, and the DC charging mode is non-isolated DC charging, the first switch K1, the second switch K2, the switch K11, the switch K7, and the switch K8 are closed, and other switch elements K3, K4, K9, and K10 are open. In this case, a DC voltage received by the DC charging port 101 is boosted through the three-phase windings U, V, and W of the motor coil 11 and the bridge arm converter 12, and then is outputted to the external battery 200 though the capacitor C1, to implement DC charging of the external battery 200.

In addition, when the energy conversion device works in the DC charging mode, and the DC charging mode is isolated DC charging, as shown in FIG. 14, the first switch K1, the second switch K2, the switch K9, and the switch K10 are closed, and other switch elements K3, K4, K6, K7, and K11 are opened. In this case, after a DC voltage received by the DC charging port 101 passes through the inductor L1, is pumped into the three-phase windings U, V, and W of the motor coil 11 from a motor, and is then boosted through the bridge arm converter 12, a voltage U0 is outputted. After being filtered by using the capacitor C1 and being subject to full-bridge rectification by using the switch tubes Q3, Q4, Q5, and Q6, the voltage U0 is outputted to the transformer T1. After being inverted by the transformer T1 and rectified by the switch tubes Q7, Q8, Q9, and Q10, the voltage passes through the filter capacitor C4 and is outputted to the external battery 200, to implement isolated DC charging of the external battery 200. It should be noted that, in this embodiment, the isolated DC charging is mainly used for a case in which a special charging facility is difficult to match a battery voltage of an electric vehicle and two-stage voltage regulation is required.

In an embodiment, as shown in FIG. 15, the first switch K1, the second switch K2, the switch K9, and the switch K10 are closed, and other switch elements K3, K4, K6, K7, and K11 are open. In this case, after a DC voltage received by the DC charging port 101 is pumped into the three-phase windings U, V, and W of the motor coil 11 from a motor and is then boosted through the bridge arm converter 12, a voltage U0 is outputted. After being filtered by using the capacitor C1 and being then subject to full-bridge rectification by using the switch tubes Q3, Q4, Q5, and Q6, the voltage U0 is outputted to the transformer T1. After being inverted by the transformer T1 and being rectified by the switch tubes Q7, Q8, Q9, and Q10, the voltage passes through the filter capacitor C4 and is outputted to the external battery 200, to implement isolated DC charging of the external battery 200.

As shown in FIG. 14, when the energy conversion device works in the AC charging mode, the third switch K3, the fourth switch K4, the switch K11, the switch K9, and the switch K10 are closed, and other switch elements K1, K2, K7, and K8 are open. In this case, after an AC voltage received by the AC charging port 102 at one end passes through the inductor L1, enters the three-phase windings U, V, and W of the motor coil 11 from a neutral line led out from a neutral point of the motor, and reaches the bridge arm converter 12, and the AC voltage at the other end passes through bidirectional bridge arms Q1 and Q2 and is subject to full-bridge rectification formed by the bridge arms Q1 and Q2 and the bridge arm converter 12, a voltage U0 is outputted. The voltage U0 is inverted by the transformer T1 after being filtered by the capacitor C1 and being rectified by a full bridge formed by Q3 to Q6, and the voltage is outputted to the external battery 200 for charging after being subject to full-bridge rectification formed by Q7 to Q10 and being filtered by the capacitor C4, to implement AC charging of the external battery 200.

In an embodiment, when the energy conversion device works in the AC charging mode, the third switch K3, the fourth switch K4, the switch K11, the switch K7, and switch K8 are closed, and other switches K1, K2, K9, and K10 are open. In this case, after an AC voltage received by the AC charging port 102 at one end passes through the inductor L1, enters the three-phase windings U, V, and W of the motor coil 11 from a neutral line led out from a neutral point of the motor, and reaches the bridge arm converter 12, and the AC voltage at the other end passes through bridge arms Q1 and Q2 and is subject to full-bridge rectification formed by the bridge arms Q1 and Q2 and the bridge arm converter 12, a voltage U0 is outputted. The voltage U0 is outputted to the external battery 200 for charging after being filtered by the capacitor C1, to implement AC charging of the external battery 200.

In an embodiment, as shown in FIG. 15, when the energy conversion device works in the AC charging mode, the third switch K3, the fourth switch K4, the switch K11, the switch K9, and the switch K10 are closed, and other switch elements K1, K2, K7, and K8 are open. In this case, after an AC voltage received by the AC charging port 102 at one end enters the three-phase windings U, V, and W of the motor coil 11 from a neutral line led out from a neutral point of the motor and reaches the bridge arm converter 12, and the AC voltage at the other end passes through first bridge arms Q1 and Q2 and is subject to full-bridge rectification formed by the bridge arms Q1 and Q2 and the bridge arm converter 12, a voltage U0 is outputted. The voltage U0 is inverted by the transformer T1 after being filtered by the capacitor C1 and being rectified by a full bridge formed by Q3 to Q6, and the voltage is outputted to the external battery 200 for charging after being subject to full-bridge rectification formed by Q7 to Q10 and then being filtered by the capacitor C4, to implement AC charging of the external battery 200. In an embodiment, the third switch K3, the fourth switch K4, the switch K11, the switch K7, and the switch K8 are closed, and other switches K1, K2, K9, and K10 are open. In this case, after an AC voltage received by the AC charging port 102 at one end enters the three-phase windings U, V, and W of the motor coil 11 from a neutral line led out from a neutral point of the motor and reaches the bridge arm converter 12, and the AC voltage at the other end passes through bridge arms Q1 and Q2 and is subject to full-bridge rectification formed by the bridge arms Q1 and Q2 and the bridge arm converter 12, a voltage U0 is outputted. The voltage U0 is outputted to the external battery 200 for charging after being filtered by the capacitor C1, to implement AC charging of the external battery 200.

In this embodiment, according to the energy conversion device provided in this application, on or off of the switches are controlled, so that after AC power received by the AC charging port 102 passes through the inductor L1, the motor coil 11, the bridge arm converter 12, and the bidirectional bridge arm 13, AC charging is performed on the external battery 200, and the AC charging manner is not limited to one manner. That is, the AC charging manner of the energy conversion device implements redundancy using a plurality of solutions, and a working voltage can be adjusted autonomously, to improve the charging efficiency while an AC charging function of the energy conversion device is ensured.

As shown in FIG. 14, when the energy conversion device works in the AC discharging mode, the second switch unit 142 and the sixth switch unit 146 are turned on, and the first switch unit 141 and the fifth switch unit 145 are open, so that high-voltage DC power outputted by the external battery 200 is discharged externally through the AC charging port 102 under the action of the inductor L1, the motor coil 11, the bridge arm converter 12, the bidirectional bridge arm 13, and the bidirectional DC module 15.

In an embodiment, when the energy conversion device works in the AC discharging mode, the second switch unit 142 and the fifth switch unit 145 are turned on, and the first switch unit 141 and the sixth switch unit 146 are open, so that high-voltage DC power outputted by the external battery 200 is discharged externally through the AC charging port 102 under the action of the inductor L1, the motor coil 11, the bridge arm converter 12, and the bidirectional bridge arm 13.

As shown in FIG. 15, when the energy conversion device works in the AC discharging mode, the second switch unit 142 and the sixth switch unit 146 are turned on, and the first switch unit 141 and the fifth switch unit 145 are open, so that high-voltage DC power outputted by the external battery 200 is discharged externally through the AC charging port 102 under the action of the motor coil 11, the bridge arm converter 12, the bidirectional bridge arm 13, and the bidirectional DC module 15.

In an embodiment, when the energy conversion device works in the AC discharging mode, the second switch unit 142 and the fifth switch unit 145 are turned on, and the first switch unit 141 and the sixth switch unit 146 are open, so that high-voltage DC power outputted by the external battery 200 is discharged externally through the AC charging port 102 under the action of the motor coil 11, the bridge arm converter 12, and the bidirectional bridge arm 13.

It should be noted that, in this embodiment, the AC discharging working mode of the energy conversion device is opposite to the AC charging working mode of the energy conversion device. Therefore, for a specific working principle of the AC discharging working mode of the energy conversion device, reference may be made to the specific working process of the AC charging mode of the energy conversion device. Details are not described herein again.

In addition, because the energy conversion device provided in this application can work in both the AC charging mode and the AC discharging mode, when the energy conversion devices are disposed on two vehicles, one of the vehicles can perform AC discharging and the other can perform AC charging, thereby implementing vehicle charging with each other.

As shown in FIG. 14, when the energy conversion device works in the motor driving mode, the switch K11, the switch K7, and the switch K8 are closed, and other switches K1 to K4, K9, and K10 are open. In this case, the external battery 200 outputs high-voltage DC power, and the high-voltage DC power passes through a three-phase motor drive axle of the bridge arm converter 12, and three-phase AC power is outputted to the three-phase windings of the motor coil 11, to drive the motor.

In this embodiment, according to the energy conversion device provided in this application, the motor coil 11, the bridge arm converter 12, the bidirectional bridge arm 13, and the bidirectional DC module 15 are integrated into one circuit, so that the energy conversion device may perform vehicle motor driving, or may perform AC charging/discharging of a vehicle battery, thereby improving the integration level of a circuit, reducing circuit costs, reducing a circuit volume, and implementing a simple circuit structure.

As shown in FIG. 14, when the energy conversion device works in the DC external discharging mode, the switch K11, the switch K7, the switch K8, the switch K1, and the switch K2 are closed, and the switch K3, the switch K4, the switch K9, and the switch K10 are open. In this case, DC power outputted by the external battery 200 passes through the three-phase motor drive axle of the bridge arm converter 12, the three-phase windings U, V, and W of the motor coil 11, the inductor L1, and the DC charging port 101, to implement DC discharging.

As shown in FIG. 14, when the energy conversion device works in a driving discharging mode, the switch K11, the switch K6, and the switch K7 are closed, and the switch K1 to the switch K4, the switch K9, and the switch K10 are open. In this case, after a high-voltage current outputted by the external battery 200 passes through the capacitor C1, one part of the high-voltage current is outputted to the three-phase motor drive axle of the bridge arm converter 12. The part of the high-voltage current is converted by the three-phase motor drive axle, to drive the three-phase windings of the motor coil 11. Another part of the high-voltage current is outputted to a full-bridge circuit formed by the switch Q3 to the switch Q6. The another part of the high-voltage current is rectified by the full-bridge circuit, is then converted by the transformer T1, the capacitor C2, and the inductor L2, and is then rectified by a full-bridge circuit formed by the switch Q11 to the switch Q14, a 13.8V low-voltage DC voltage is outputted to an in-vehicle discharging port through capacitor filtering.

In this embodiment, according to the energy conversion device provided in this application, on or off of the switches is controlled, so that high-voltage DC power outputted by the external battery 200 drives the motor to work under the action of the bridge arm converter 12, the bidirectional bridge arm 13, and the bidirectional DC module 15. In addition, low-voltage DC power is outputted by using the high-voltage DC power outputted by the external battery 200 under the action of the bidirectional DC module 15. Therefore, motor driving and DC discharging can be performed simultaneously by using one circuit.

In another embodiment of this application, as shown in FIG. 14, when the energy conversion device works in the DC discharging mode, the switch K9, the switch K10, and the switch K11 are closed, and the switch K1, the switch K2, the switch K3, the switch K4, the switch K7, and the switch K8 are open. In this case, a high-voltage current outputted by the external battery 200 is outputted to a full-bridge circuit formed by the switch Q7 to the switch Q10 through the capacitor C4. After the high-voltage current is rectified by the full-bridge circuit, is converted by the inductor L3, the capacitor C3, and the transformer T1, and is then rectified by the switch Q11 to the switch Q14 again, the high-voltage current is filtered by the capacitor C5, and a 13.8V low-voltage DC power is outputted to the in-vehicle discharging port.

In this embodiment, according to the energy conversion device provided in this application, on or off of the switches in the circuit is controlled, low-voltage DC power is outputted by using the high-voltage DC power outputted by the external battery 200 under the action of the bidirectional DC module 15, and different DC power output paths may be selected in a DC power output process, to avoid a problem that DC discharging cannot be performed when the circuit has only one DC discharging path and the path fails.

In another embodiment of this application, as shown in FIG. 14, when the energy conversion device works in an intelligent charging mode, the switch K9, the switch K10, and the switch K11 are closed, and the switches K1 to K4, the switch K7, and the switch K8 are open. In this case, a high-voltage current outputted by the external battery 200 is outputted to a full-bridge circuit formed by the switch Q7 to the switch Q10 through the capacitor C4. After the high-voltage current is rectified by the full-bridge circuit, is converted by the inductor L3, the capacitor C3, and the transformer T1, and is then rectified by the switch Q11 to the switch Q14 again, the high-voltage current is filtered by the capacitor C5, and a 13.8V low-voltage DC voltage is outputted, so that the storage battery is charged by using the 13.8V low-voltage DC voltage.

In this embodiment, the energy conversion device provided in this application controls the switches of the circuits to be turned on or off of, to convert the high-voltage DC power outputted by the external battery 200 to the low-voltage DC power using the bidirectional DC module 15, and the storage battery can be charged by using the outputted DC power, thereby implementing intelligent charging of the energy conversion device.

In another embodiment of this application, as shown in FIG. 14, when the energy conversion device works in an AC external emergency discharging mode, the switch K3 and the switch K4 are closed, and the switch K1, the switch K2, and the switch K7 to the switch K11 are open. In this case, after low-voltage DC power outputted by the storage battery passes through the filter capacitor C5, is rectified by a full-bridge circuit formed by the switch Q11 to the switch Q14, is converted by the transformer T1, the inductor L2, and the capacitor C2, and is then rectified by a bridge rectification circuit formed by the switch Q3 to the switch Q6, the low-voltage DC power is outputted to the capacitor C1. After being filtered by the capacitor C1, the low-voltage DC power is then converted to AC power by using the three-phase motor drive axle of the bridge arm converter 12 and a circuit formed by the switch Q1 and the switch Q2. After being filtered by the three-phase windings of the motor coil 11 and the inductor L1, the AC power is outputted by passing through the AC charging port 102 for use outside a vehicle, to implement the AC external emergency discharging mode of the energy conversion device.

In an embodiment, as shown in FIG. 15, when the energy conversion device works in an AC external emergency discharging mode, the switch K3 and the switch K4 are closed, and the switch K1, the switch K2, and the switch K7 to the switch K11 are open. In this case, after low-voltage DC power outputted by the storage battery passes through the filter capacitor C5, is rectified by a full-bridge circuit formed by the switch Q11 to the switch Q14, is converted by the transformer T1, the inductor L2, and the capacitor C2, and is then rectified by a bridge rectification circuit formed by the switch Q3 to the switch Q6 again, the low-voltage DC power is outputted to the capacitor C1. After being filtered by the capacitor C1, the low-voltage DC power is converted to AC power by using the three-phase motor drive axle of the bridge arm converter 120 and a circuit formed by the switch Q1 and the switch Q2. After being filtered by the three-phase windings of the motor coil 11, the AC power is outputted by passing through the AC charging port 102 for use outside a vehicle, to implement the AC external emergency discharging mode of the energy conversion device.

In this embodiment, when the external battery 200 fails and is unusable, the energy conversion device provided in this application controls the switches to be turned on or off, so that the low-voltage DC power outputted by the storage battery passes through the AC charging port 102 and provides a AC power to the outside, under the action of the bidirectional DC module 15, the bidirectional bridge arm 13, the bridge arm converter 12, the motor coil 11, and the like, to implement AC external emergency discharging of the energy conversion device.

In another embodiment of this application, as shown in FIG. 14, when the energy conversion device works in an emergency driving mode, the switches in the energy conversion device are all open. In this case, after passes through the filter capacitor C5, the low-voltage DC power outputted by the storage battery is rectified by a full-bridge circuit formed by the switch Q11 to the switch Q14, is converted by the transformer T1, the inductor L2, and the capacitor C2, and is rectified by a bridge rectification circuit formed by the switch Q3 to the switch Q6 to output the low-voltage DC power to the capacitor C1. After the low-voltage DC power is filtered by the capacitor C1, the three-phase motor drive axle of the bridge arm converter 12 outputs the three-phase AC power to the three-phase windings of the motor coil 11 to drive the motor.

In this embodiment, when the external battery 200 fails and is unusable, and the motor needs to be driven, the energy conversion device provided in this application controls on or off of the switch element K1 to the switch element K11, so that the low-voltage DC power outputted by the storage battery drives the motor after passing through the bidirectional DC module 15 and the bridge arm converter 12, to implement emergency drive of the energy conversion device, thereby ensuring normal work of the vehicle.

It should be noted that, in this application, a specific working mode of the energy conversion device having the driving and charging functions and a specific working principle of the energy conversion device in each mode are described by using the circuits shown in FIG. 14 and FIG. 15 as an example. In addition, when an implementation structure of the energy conversion device is the circuit shown in FIG. 17, a working principle of a first DC/DC conversion circuit in the energy conversion device is the same as the working principle and the working process of the first converter 151, the second converter 152, and the transformation unit 154 in the bidirectional DC module 15 shown in FIG. 14 or FIG. 15. A working principle of a second DC/DC conversion circuit is the same as the working principle and the working process of the first converter 151 and the third converter 153 in FIG. 14 or FIG. 15. Therefore, for the working principles of the first DC/DC conversion circuit and the second DC/DC conversion circuit, reference may be made to the working principle of the bidirectional DC module 15 shown in FIG. 14 or FIG. 15. Details are not described herein again.

Figure 19:
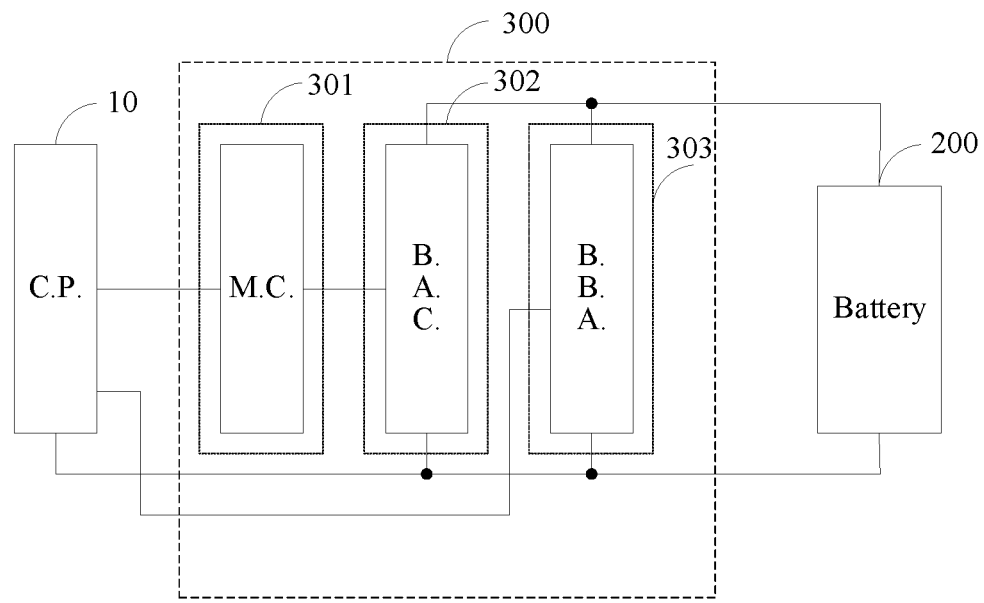
FIG. 19 is a schematic diagram of a module structure of a power system according to a tenth embodiment of this application.

In another embodiment of this application, as shown in FIG. 19, this application further provides a power system 300. The power system includes an energy conversion device and a control module (not shown in the figure).

The energy conversion device includes a motor 301, a motor control module 302, and an in-vehicle charging module 303. The motor 301 includes a motor coil. The motor control module 302 includes a bridge arm converter. The bridge arm converter is connected to one end of the motor coil, and the other end of the motor coil is connected to an external charging port 10. The in-vehicle charging module 303 includes a bidirectional bridge arm. The bidirectional bridge arm is connected to the bridge arm converter in parallel to form a first common end and a second common end. The first common end is connected to one end of an external battery 200. The second common end is connected to the other end of the external battery. The external charging port 10 is connected to the second common end and the bidirectional bridge arm.

The control module is configured to: control a DC charging circuit formed by the external charging port 10, the motor coil, the bridge arm converter, and the external battery 200, control an AC charging circuit formed by the external charging port 10, the motor coil, the bridge arm converter, the bidirectional bridge arm, and the external battery 200, and control a motor drive circuit formed by the motor coil, the bridge arm converter, and the external battery 200; and the DC charging circuit, the AC charging circuit, and the motor drive circuit share the motor coil and the bridge arm converter.

In an embodiment of this application, the energy conversion device further includes a switch module. The control module controls the switch module, to switch between a DC charging mode, an AC charging mode, and a driving mode.

In the DC charging mode, the external charging port 10, the motor coil, the bridge arm converter, and the external battery 200 form the DC charging circuit.

In the AC charging mode, the external charging port 10, the motor coil, the bridge arm converter, the bidirectional bridge arm 13, and the external battery 200 form the AC charging circuit.

In the driving mode, the motor coil, the bridge arm converter, and the external battery 200 form the motor drive circuit.

In an embodiment of this application, the external charging port includes a DC charging port and an AC charging port, and the switch module includes a first switch unit and a second switch unit.

The control module controls the first switch unit to be turned on and controls the second switch unit to be opened, and the DC charging port, the first switch unit, the motor coil, the bridge arm converter, and the external battery form a DC charging circuit, to enter the DC charging mode.

The control module controls the first switch unit to be opened and controls the second switch unit to be turned on, and the AC charging port, the second switch unit, the motor coil, the bridge arm converter, the bidirectional bridge arm, and the external battery form an AC charging circuit, to enter the AC charging mode.

The control module controls both the first switch unit and the second switch unit to be opened, and the motor coil, the bridge arm converter, and the external battery form the motor drive circuit, to enter the driving mode.

In an embodiment of this application, the external charging port includes an AC/DC charging port, and the switch module includes a third switch unit and a fourth switch unit.

The control module controls the third switch unit to be turned on and controls the fourth switch unit to be connected to the bridge arm converter, and the AC/DC charging port, the third switch unit, the fourth switch unit, the motor coil, the bridge arm converter, and the external battery form a DC charging circuit, to enter the DC charging mode.

The control module controls the third switch unit to be turned on and controls the fourth switch unit to be connected to the bidirectional bridge arm, and the AC/DC charging port, the third switch unit, the fourth switch unit, the motor coil, the bridge arm converter, and the external battery form an AC charging circuit, to enter the AC charging mode.

The control module controls both the third switch unit and the fourth switch unit to be opened, and the motor coil, the bridge arm converter, and the external battery form the motor drive circuit, to enter the driving mode.

In an embodiment of this application, the energy conversion device further includes a neutral point switch.

The motor coil includes three-phase windings. Each phase winding includes N coil branches. First ends of the N coil branches in each phase winding are connected together and then connected to the bridge arm converter. Second ends of the N coil branches in each phase winding are connected to second ends of N coil branches in the two other phase windings in a one-to-one correspondence, to form N neutral points. The external charging port is connected to M neutral points. N is an integer greater than 1, and M is a positive integer less than N.

The control module controls the neutral point switch, so that the M neutral points in the N neutral points of the motor coil are connected to the external charging port.

In an embodiment of this application, the bridge arm converter includes three-phase bridge arms. When the energy conversion device works in the DC charging mode, the control module sends a first control signal, a second control signal, and a third control signal to the bridge arm converter. The first control signal, the second control signal, and the third control signal sequentially differ by a preset phase.

The control module controls, according to the first control signal, two power switch units of a first-phase bridge arm to be turned on alternately; the control module controls, according to the second control signal, two power switch units of a second-phase bridge arm to be turned on alternately; and the control module controls, according to the third control signal, two power switch units of a third-phase bridge arm to be turned on alternately, to implement DC charging.

In an embodiment of this application, the bridge arm converter includes the three-phase bridge arms. When the energy conversion device works in the AC charging mode, the control module sends a fourth control signal, a fifth control signal, and a sixth control signal to the bridge arm converter. The fourth control signal, the fifth control signal, and the sixth control signal sequentially differ by a preset phase.

The control module controls, according to an AC power frequency, two power switch units of the bidirectional bridge arm to be turned on alternately; the control module controls, according to the fourth control signal, the two power switch units of the first-phase bridge arm to be turned on alternately; the control module controls, according to the fifth control signal, the two power switch units of the second-phase bridge arm to be turned on alternately; and the control module controls, according to the sixth control signal, the two power switch units of the sixth-phase bridge arm to be turned on alternately, to implement AC charging.

Figure 21:
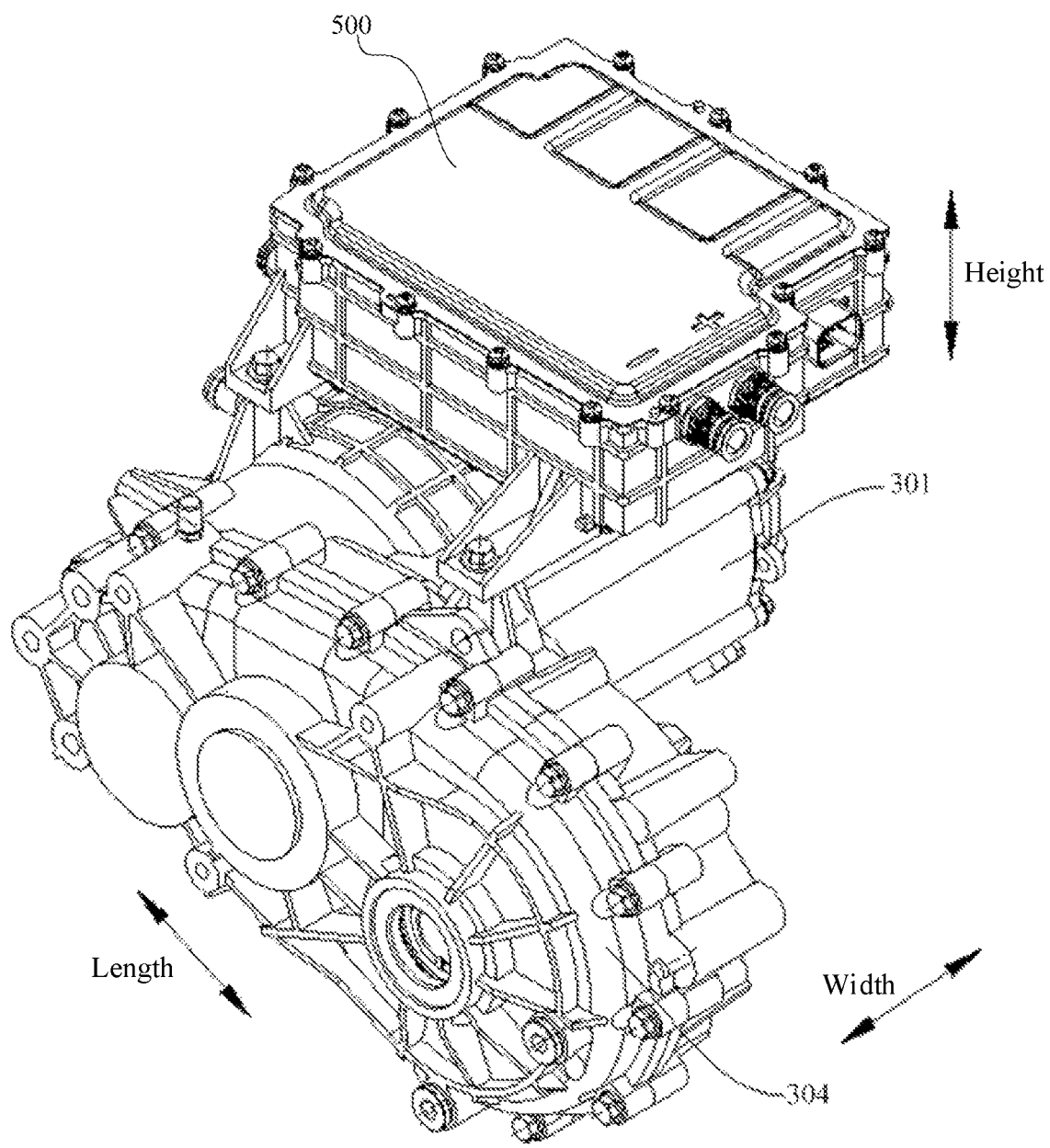
FIG. 21 is a schematic structural diagram of a power system according to a twelfth embodiment of this application.

In an embodiment of this application, as shown in FIG. 21, the motor control module 302 and the in-vehicle charging module 303 are integrated in a first box 500. It should be noted that, in another embodiment of this application, the motor control module 302 and the in-vehicle charging module 303 may be disposed in two boxes respectively. No specific limitation is imposed herein.

In this embodiment, the motor control module 302 and the in-vehicle charging module 303 are integrated in an integrated box, so that the overall structure of the power system 300 is more impact, to reduce a volume of the power system 300, thereby reducing a weight of a vehicle to which the power system 300 is applied.

In an embodiment of this application, as shown in FIG. 21, the power system 300 further includes a reducer 304. The reducer 304 is power-coupled to the motor 301 (not shown in the figure, referring to FIG. 19). The reducer 304 and the motor 301 are integrated in a second box.

In an embodiment of this application, the first box is fixedly connected to the second box.

During specific implementation, the first box may be connected to the second box by any connection member having a fixing function, or a fixing member that may be connected to the second box is disposed on the first box, or a fixing member that may be connected to the first box is disposed on the second box. No specific limitation is imposed herein.

In this embodiment, the first box and the second box are fixed, and separation between the first box and the second box can be effectively prevented, to ensure that the motor control module 302, the in-vehicle charging module 303, the motor 301, and the reducer 304 do not fail because the boxes fall off, thereby improving the working reliability and stability of the power system 300.

Figure 20:
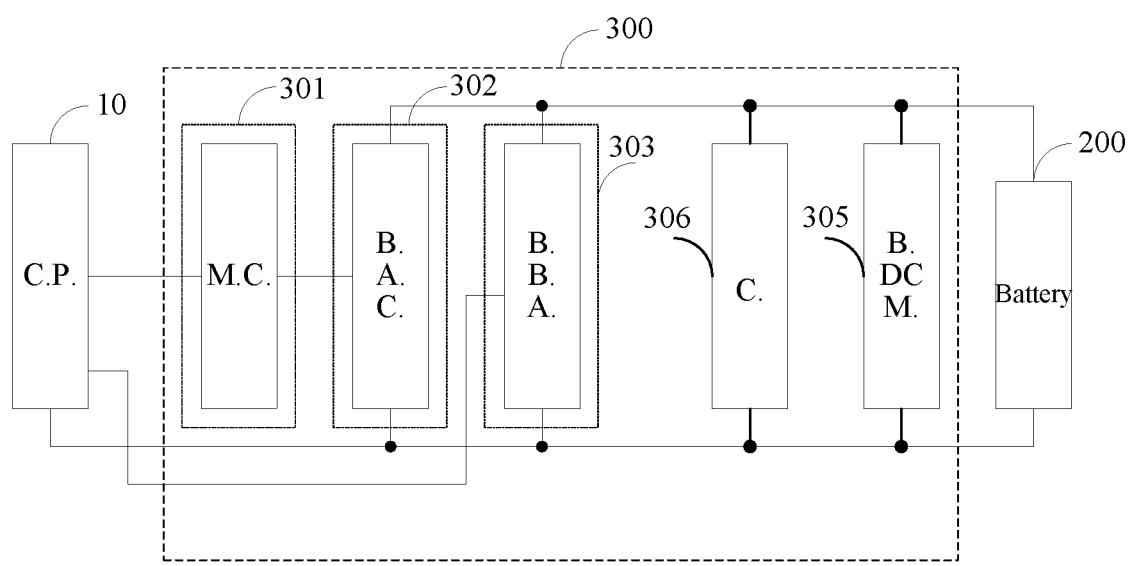
FIG. 20 is a schematic diagram of a module structure of a power system according to an eleventh embodiment of this application.

In an embodiment of this application, as shown in FIG. 20, the power system 300 further includes a bidirectional DC module 305. The bidirectional DC module 305 is respectively electrically connected to the in-vehicle charging module 303 and the external battery 200, and the bidirectional DC module 305 is integrated in the first box.

In this embodiment, the bidirectional DC module 305 is added to the power system 300, so that the bidirectional DC module 305 and the external charging port 10, the motor 301, the motor control module 302, and the in-vehicle charging module 303 in the power system 300 form another AC charging circuit, to enrich the AC charging mode of the power system 300, and a charging process of the power system 300 can implement redundancy using a plurality of solutions, thereby improving security of the power system 300 in an AC charging process.

In an embodiment of this application, as shown in FIG. 20, the power system 300 further includes a capacitor 306.

The capacitor 306 is connected to the motor control module 302 in parallel. The capacitor 306 is integrated in the first box.

During specific work, when the power system 300 works in the DC charging mode or the AC charging mode, the capacitor 306 may filter a voltage outputted by the motor control module 302 or voltages outputted by the motor control module 302 and the in-vehicle charging module 303 and may further perform energy storage according to the voltage outputted by the motor control module 302 or the voltages outputted by the motor control module 302 and the in-vehicle charging module 303 during DC charging or AC charging of the external battery 200, to complete DC charging or AC charging of the external battery 200.

In this embodiment, the capacitor 306 is disposed in the power system 300. The capacitor 306 filters a voltage outputted by the motor control module 302 or voltages outputted by the motor control module 302 and the in-vehicle charging module 303 and may also perform energy storage according to the voltage outputted by the motor control module 302 or the voltages outputted by the motor control module 302 and the in-vehicle charging module 303, to complete DC charging or AC charging of the external battery 200. Therefore, in addition to a normal charging function of the power system 300, it can also be ensured that other clutters are prevented from interfering with the charging process.

It should be noted that, in this embodiment, for a specific structure and a working principle of the energy conversion device, reference may be made to the foregoing energy conversion device in FIG. 1 to FIG. 18. Therefore, for a description of the specific working principle of the energy conversion device, reference may be made to a detailed description in FIG. 1 to FIG. 18. Details are not described herein again.

In another embodiment of this application, this application further provides a vehicle, including a power system. It should be noted that, the power system included in the vehicle provided in this embodiment of this application is the same as the power system 300 shown in FIG. 19 to FIG. 21. Therefore, for a specific working principle of the power system in the vehicle provided in this embodiment of this application, reference may be made to the foregoing detailed description in FIG. 19 to FIG. 21. Details are not described herein again.

In this application, the vehicle provided in this application adopts the power system 300 including the motor 301, the motor control module 302, and the in-vehicle charging module 303, so that when the power system 300 is applied, the vehicle can work in a driving mode, a DC charging mode, and an AC charging mode in a time-sharing manner, and motor driving and battery charging of the vehicle are implemented by using the same system, especially DC charging and AC charging can be implemented by using the same circuit topology, so that a degree of reuse of components is high, a system integration level is high, and a structure is simple, thereby reducing system costs, reducing a system volume, and resolving problems that an existing motor driving system and an existing charging system have a complex overall structure, a low level of integration, a large volume, and high costs.

In the description of this application, it should be understood that orientation or position relationships indicated by the terms such as "center", "longitudinal", "transverse", "length", "width", "thickness", "on", "below", "front", "back", "left", "right", "vertical", "horizontal", "top", "bottom", "inside", "outside", "clockwise", "anticlockwise", "axial direction", "radial direction", and "circumferential direction" are based on orientation or position relationships shown in the accompanying drawings, and are used only for ease and brevity of illustration and description, rather than indicating or implying that the mentioned apparatus or component needs to have a particular orientation or must be constructed and operated in a particular orientation. Therefore, such terms should not be construed as limiting of this application.

In addition, the terms "first" and "second" are used for descriptive purposes only and are not to be construed as indicating or implying relative importance or implicitly indicating the number of technical features indicated. Therefore, features defining "first" and "second" may explicitly or implicitly include one or more such features. In the descriptions of this application, "a plurality of" means two or more, unless otherwise definitely and specifically limited.

In this application; filling, unless expressly stated and defined otherwise, the terms "mounting", "connected", "connection", "fixed", etc. are to be construed broadly, for example, as fixed connection, detachable connection or integral connection, as mechanical connection or electrical connection, and as direct connection or indirect connection via an intermediary or communication inside two elements or interaction between two elements. A person of ordinary skill in the art may understand the specific meanings of the foregoing terms in this application according to specific situations.

In this application, unless otherwise explicitly specified or defined, the first feature being located "above" or "below" the second feature may be the first feature being in a direct contact with the second feature, or the first feature being in an indirect contact with the second feature through an intermediary. In addition, that the first feature is "above", "over", or "on" the second feature may indicate that the first feature is directly above or obliquely above the second feature, or may merely indicate that the horizontal position of the first feature is higher than that of the second feature. That the first feature is "below", "under", and "beneath" the second feature may be that the first feature is directly below or obliquely below the second feature, or may merely indicate that the horizontal position of the first feature is lower than that of the second feature.

In the descriptions of this specification, a description of a reference term such as "an embodiment", "some embodiments", "an example", "a specific example", or "some examples" means that a specific feature, structure, material, or characteristic that is described with reference to the embodiment or the example is included in at least one embodiment or example of this application. In this specification, schematic descriptions of the foregoing terms are not necessarily directed at the same embodiment or example. Besides, the specific features, the structures, the materials or the characteristics that are described may be combined in proper manners in any one or more embodiments or examples. In addition, a person skilled in the art may integrate or combine different embodiments or examples described in the specification and features of the different embodiments or examples as long as they are not contradictory to each other.

Although the embodiments of this application are shown and described above, it may be understood that the foregoing embodiments are exemplary, and cannot be understood as a limitation to this application. A person of ordinary skill in the art may make changes, modifications, replacements, and variations to the foregoing embodiments without departing from the scope of this application.

What is claimed is:

1. An energy conversion device, comprising a motor coil, a bridge arm converter, and a bidirectional bridge arm, wherein:
   the bridge arm converter is connected to the motor coil and the bidirectional bridge arm;
   the motor coil, the bridge arm converter, and the bidirectional bridge arm are connected to an external charging port, the motor coil is connected between the external charging port and the bridge arm converter, and the bridge arm converter and the bidirectional bridge arm are connected to an external battery;
   the motor coil, the bridge arm converter, and the external charging port form a direct current (DC) charging circuit for charging the external battery;
   the motor coil, the bridge arm converter, the bidirectional bridge arm, and the external charging port form an alternating current (AC) charging circuit for charging the external battery, and
   the motor coil, the bridge arm converter, and the external battery form a motor drive circuit.

2. The energy conversion device according to claim 1, wherein the motor coil comprises three-phase windings, each phase winding comprises N coil branches, first ends of the N coil branches in each phase winding are connected together and connected to the bridge arm converter, a second end of a coil branch in each phase winding is connected to second ends of corresponding coil branches in two other phase windings, to form N neutral points, and the external charging port is connected to M neutral points of the N neutral points, and wherein N is an integer greater than 1, and M is a positive integer less than N.

3. The energy conversion device according to claim 2, further comprising a neutral point switch, wherein the neutral point switch is configured to control the M neutral points in the N neutral points of the motor coil to be connected to the external charging port.

4. The energy conversion device according to claim 1, further comprising a switch circuit, wherein
   a first end of the switch circuit is connected to the external charging port, and a second end of the switch circuit is connected to the motor coil, the bridge arm converter, and the bidirectional bridge arm.

5. The energy conversion device according to claim 4, wherein:
   the external charging port comprises a DC charging port and an AC charging port;
     the switch circuit comprises a first switch unit and a second switch unit, and the DC charging port, the first switch unit, the motor coil, and the bridge arm converter form the DC charging circuit or a DC discharging circuit for the external battery; and
   the AC charging port, the second switch unit, the motor coil, the bridge arm converter, and the bidirectional bridge arm form the AC charging circuit or an AC discharging circuit for the external battery.

6. The energy conversion device according to claim 5, wherein
   the first switch unit comprises a first switch and a second switch, and the second switch unit comprises a third switch and a fourth switch;
     a first end of the first switch is connected to the DC charging port, and a second end of the first switch is connected to the motor coil;

a first of the second switch is connected to the DC charging port, and a second end of the second switch is connected to the bridge arm converter;
a first of the third switch is connected to the AC charging port, and a second end of the third switch is connected to the motor coil; and
a first of the fourth switch is connected to the AC charging port, and a second end of the fourth switch is connected to the bidirectional bridge arm.

7. The energy conversion device according to claim 5, wherein the switch circuit further comprises a fifth switch unit, a first end of the fifth switch unit is connected to the external battery, and a second end of the fifth switch unit is connected to the bridge arm converter and the bidirectional bridge arm.

8. The energy conversion device according to claim 5, further comprising a bidirectional DC converter, wherein
the bidirectional DC converter comprises a first DC end and a second DC end, and the first DC end is connected to the bidirectional bridge arm; and
the switch circuit further comprises a sixth switch unit, a first end of the sixth switch unit is connected to the second DC end, and a second end of the sixth switch unit is connected to the external battery.

9. The energy conversion device according to claim 8, wherein the bidirectional DC converter further comprises a third DC end, and the third DC end is connected to a storage battery or an in-vehicle discharging port.

10. The energy conversion device according to claim 9, wherein
the bidirectional DC converter comprises a first converter, a second converter, a third converter, and a transformer, a primary side, a first secondary side, and a second secondary side of the transformer are respectively connected to the first converter, the second converter, and the third converter, and
the first converter is connected to the bidirectional bridge arm in parallel, the second converter is connected to the external battery in parallel, and the third converter is connected to the storage battery or the in-vehicle discharging port in parallel.

11. The energy conversion device according to claim 10, wherein the third converter comprises a first sub-converter and a second sub-converter, and the first sub-converter and the second sub-converter are connected to the second secondary side of the transformer.

12. The energy conversion device according to claim 8, wherein
the bidirectional DC converter comprises a first DC/DC conversion circuit and a second DC/DC conversion circuit;
a first end of the first DC/DC conversion circuit is connected to the bidirectional bridge arm, and a second end of the first DC/DC conversion circuit is connected to the sixth switch unit; and
a first end of the second DC/DC conversion circuit is connected to the bidirectional bridge arm, and a second end of the second DC/DC conversion circuit is connected to a storage battery.

13. The energy conversion device according to claim 4, wherein
the external charging port comprises an AC/DC charging port, and the switch circuit comprises a third switch unit and a fourth switch unit;
a first end of the third switch unit is connected to the AC/DC charging port, and a second end of the third switch unit is connected to the motor coil;
a first end of the fourth switch unit is connected to the AC/DC charging port, and a second end of the fourth switch unit is connected to the bridge arm converter or the bidirectional bridge arm;
when the fourth switch unit is connected to the bridge arm converter, the AC/DC charging port, the third switch unit, the fourth switch unit, the motor coil, and the bridge arm converter form the DC charging circuit or a DC discharging circuit for the external battery; and
when the fourth switch unit is connected to the bidirectional bridge arm, the AC/DC charging port, the third switch unit, the fourth switch unit, the motor coil, the bridge arm converter, and the bidirectional bridge arm form the AC charging circuit or an AC discharging circuit for the external battery.

14. The energy conversion device according to claim 13, wherein
the third switch unit comprises a fifth switch, a first end of the fifth switch is connected to the AC/DC charging port, and a second end of the fifth switch is connected to the motor coil; and
the fourth switch unit comprises a single-pole double-throw switch, the single-pole double-throw switch comprises one moving end and two fixed ends, the moving end is connected to the AC/DC charging port, a first fixed end is connected to the bridge arm converter, and a second fixed end is connected to the bidirectional bridge arm; or
the fourth switch unit comprises two switches including a sixth switch and a seventh switch, a first end of the sixth switch is connected to the AC/DC charging port, and a second end of the sixth switch is connected to the bridge arm converter; and a first end of the seventh switch is connected to the AC/DC charging port, and a second end of the seventh switch is connected to the bidirectional bridge arm.

15. The energy conversion device according to claim 1, further comprising a first capacitor, wherein the first capacitor is connected to the bidirectional bridge arm in parallel; and
the AC charging circuit, the DC charging circuit, and the motor drive circuit share the first capacitor.

16. The energy conversion device according to claim 1, wherein the bridge arm converter comprises three-phase bridge arms formed by a first power switch unit and a second power switch unit connected in series, a third power switch unit and a fourth power switch unit connected in series, and a fifth power switch unit and a sixth power switch unit connected in series, wherein
a first end of the first power switch unit, a first end of the third power switch unit, and a first end of the fifth power switch unit are connected together to form a positive end of the bridge arm converter, and the positive end of the bridge arm converter is connected to a positive end of the bidirectional bridge arm;
a second end of the second power switch unit, a second end of the fourth power switch unit, and a second end of the sixth power switch unit are connected together to form a negative end of the bridge arm converter, and the negative end of the bridge arm converter is connected to a negative end of the bidirectional bridge arm; and
a connection point between a second end of the first power switch unit and a first end of the second power switch unit is connected to a first phase coil of the motor coil, a connection point between a second end of the third power switch unit and a first end of the fourth power switch unit is connected to a second phase coil of the motor coil, and a connection point between a second end of the fifth power switch unit and a first end of the sixth power switch unit is connected to a third phase coil of the motor coil.

17. The energy conversion device according to claim 1, wherein
the bidirectional bridge arm comprises a seventh power switch unit and an eighth power switch unit connected in series; and
a first end of the seventh power switch unit is a positive end of the bidirectional bridge arm, a second end of the eighth power switch unit is a negative end of the bidirectional bridge arm, and a connection point between a second end of the seventh power switch unit and a first end of the eighth power switch unit is a midpoint of the bidirectional bridge arm.

18. The energy conversion device according to claim 1, further comprising an inductor, wherein
a first end of the inductor is connected to the external charging port, and a second end of the inductor is connected to the motor coil;
the DC charging circuit for the charging external battery comprises the external charging port, the inductor, the motor coil, and the bridge arm converter; and
the AC charging circuit for the charging external battery comprises the external charging port, the inductor, the motor coil, the bridge arm converter, and the bidirectional bridge arm.

19. A power system, comprising an energy conversion device and a control circuit, wherein
the energy conversion device comprises a motor coil, a bridge arm converter, and a bidirectional bridge arm; wherein
the bridge arm converter is connected to the motor coil and the bidirectional bridge arm;
the motor coil, the bridge arm converter, and the bidirectional bridge arm are connected to an external charging port, the motor coil is connected between the external charging port and the bridge arm converter, and the bridge arm converter and the bidirectional bridge arm are connected to an external battery;
the motor coil, the bridge arm converter, and the external charging port form a direct current (DC) charging circuit for charging the external battery;
the motor coil, the bridge arm converter, the bidirectional bridge arm, and the external charging port form an alternating current (AC) charging circuit for charging the external battery; and
the motor coil, the bridge arm converter, and the external battery form a motor drive circuit;
a motor, comprising the motor coil;
a motor control circuit, comprising the bridge arm converter, wherein the bridge arm converter is connected to a first end of the motor coil, and a second end of the motor coil is connected to the external charging port;
an in-vehicle charging circuit, comprising the bidirectional bridge arm, wherein the bidirectional bridge arm is connected to the bridge arm converter in parallel, to form a first common end and a second common end, the first common end is connected to a first end of the external battery, the second common end is connected to a second end of the external battery, and the external charging port is connected to the second common end and the bidirectional bridge arm; and
the control circuit is configured to: control the DC charging circuit for charging the external battery, control the AC charging circuit for charging the external battery, and control the motor drive circuit formed by the motor coil, the bridge arm converter, and the external battery; and the DC charging circuit, the AC charging circuit, and the motor drive circuit share the motor coil and the bridge arm converter.

20. A vehicle, comprising a power system comprising an energy conversion device and a control circuit, wherein the energy conversion device comprises
a motor coil, a bridge arm converter, and a bidirectional bridge arm; wherein
the bridge arm converter is connected to the motor coil and the bidirectional bridge arm;
the motor coil, the bridge arm converter, and the bidirectional bridge arm are connected to an external charging port, the motor coil is connected between the external charging port and the bridge arm converter, and the bridge arm converter and the bidirectional bridge arm are connected to an external battery;
the motor coil, the bridge arm converter, and the external charging port form a direct current (DC) charging circuit for charging the external battery;
the motor coil, the bridge arm converter, the bidirectional bridge arm, and the external charging port form an alternating current (AC) charging circuit for charging the external battery; and
the motor coil, the bridge arm converter, and the external battery form a motor drive circuit;
a motor, comprising the motor coil;
a motor control circuit, comprising the bridge arm converter, wherein the bridge arm converter is connected to a first end of the motor coil, and a second end of the motor coil is connected to the external charging port;
an in-vehicle charging circuit, comprising the bidirectional bridge arm, wherein the bidirectional bridge arm is connected to the bridge arm converter in parallel, to form a first common end and a second common end, the first common end is connected to a first end of the external battery, the second common end is connected to a second end of the external battery, and the external charging port is connected to the second common end and the bidirectional bridge arm; and
the control circuit is configured to: control the DC charging circuit for charging the external battery, control the AC charging circuit for charging the external battery, and control the motor drive circuit formed by the motor coil, the bridge arm converter, and the external battery; and the DC charging circuit, the AC charging circuit, and the motor drive circuit share the motor coil and the bridge arm converter.

\* \* \* \* \*